(12) United States Patent
Hosseini et al.

(10) Patent No.: US 11,722,241 B2
(45) Date of Patent: Aug. 8, 2023

(54) TRANSPORT BLOCK SIZE DETERMINATION FOR A TRANSMISSION TIME INTERVAL

(71) Applicant: QUALCOMM Incorporated, San Diego, CA (US)

(72) Inventors: Seyedkianoush Hosseini, San Diego, CA (US); Alberto Rico Alvarino, San Diego, CA (US); Amir Farajidana, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/378,552

(22) Filed: Apr. 8, 2019

(65) Prior Publication Data

US 2019/0319737 A1  Oct. 17, 2019

Related U.S. Application Data

(60) Provisional application No. 62/656,916, filed on Apr. 12, 2018.

(51) Int. Cl.
*H04L 1/00* (2006.01)
*H04L 27/00* (2006.01)
(Continued)

(52) U.S. Cl.
CPC .......... *H04L 1/0006* (2013.01); *H04L 1/0003* (2013.01); *H04L 1/003* (2013.01);
(Continued)

(58) Field of Classification Search
CPC ............... H04L 1/0003; H04L 27/0008; H04L 27/2626; H04L 1/003; H04L 27/0012; H04L 1/0016; H04W 76/27; H04W 48/16
(Continued)

(56) References Cited

U.S. PATENT DOCUMENTS 10,412,628 B2 * 9/2019 Zhang .................... H04L 1/0006
2013/0195031 A1 * 8/2013 Hessler ................ H04L 1/1819
370/329
(Continued)

FOREIGN PATENT DOCUMENTS

EP         2787670 A1    10/2014
JP      2017510159 A      4/2017
(Continued)

OTHER PUBLICATIONS

PCT/KR2018/003359 filed on Mar. 22, 2018.*
Ericsson: "TBS Scaling for Short TTI", 3GPP Draft; R1-1717175 TBS Scaling for Short TTI, 3rd Generation Partnership Project (3GPP), Mobile Competence Centre, 650, Route Des Lucioles ; F-06921 Sophia-Antipolis Cedex, France, vol. RAN WG1, No. Prague, Czech Republic; Oct. 9, 2017-Oct. 13, 2017, Oct. 8, 2017 (Oct. 8, 2017), XP051340365, Retrieved from the Internet: URL: http://www.3gpp.org/ftp/Meetings_3GPP_SYNC/RAN1/Docs/ [retrieved on Oct. 8, 2017].
(Continued)

*Primary Examiner* — Faisal Choudhury
(74) *Attorney, Agent, or Firm* — Holland & Hart LLP

(57) ABSTRACT

Methods, systems, and devices for wireless communications are described. One method may include a user equipment (UE) determining whether it is configured to support a modulation scheme such as, a quadrature-amplitude-modulation (QAM). The UE may identify a plurality of transport block size (TBS) values based on whether the UE is configured with the modulation scheme, and identify a scaled TBS value that is based on a length of a transmission time interval (TTI). The UE may map the scaled TBS value to a TBS value of a plurality of TBS values (e.g., a plurality of TBS value options). As such, the UE may communicate, with a base station during the TTI, data on a transport block having a size corresponding to the mapped TBS value.

64 Claims, 16 Drawing Sheets

(51) Int. Cl.

| | |
|---|---|
| *H04L 27/26* | (2006.01) |
| *H04W 48/16* | (2009.01) |
| *H04L 5/00* | (2006.01) |
| *H04W 76/27* | (2018.01) |
| *H04W 72/23* | (2023.01) |

(52) U.S. Cl.
CPC .......... *H04L 1/0016* (2013.01); *H04L 5/0044* (2013.01); *H04L 27/0008* (2013.01); *H04L 27/0012* (2013.01); *H04L 27/2626* (2013.01); *H04W 48/16* (2013.01); *H04W 72/23* (2023.01); *H04W 76/27* (2018.02)

(58) Field of Classification Search
USPC .......................................................... 370/329
See application file for complete search history.

(56) References Cited

U.S. PATENT DOCUMENTS

| | | | |
|---|---|---|---|
| 2014/0169297 A1* | 6/2014 | Kim ...................... | H04L 1/0016 370/329 |
| 2014/0313985 A1* | 10/2014 | Nimbalker ............ | H04L 1/0061 370/329 |
| 2015/0215913 A1* | 7/2015 | Cheng ................. | H04W 72/042 370/330 |
| 2015/0312071 A1 | 10/2015 | Chen et al. | |
| 2015/0358111 A1* | 12/2015 | Marinier ............. | H04L 27/0008 370/329 |
| 2016/0150562 A1* | 5/2016 | Nakamura ............ | H04L 5/0048 370/329 |
| 2016/0205564 A1* | 7/2016 | Ren ...................... | H04L 27/362 370/252 |
| 2016/0269218 A1* | 9/2016 | Zhang .................. | H04L 27/362 |
| 2017/0208575 A1 | 7/2017 | Chen et al. | |
| 2017/0257199 A1* | 9/2017 | Sahlin .................. | H04L 5/0044 |
| 2017/0295593 A1 | 10/2017 | Kim et al. | |
| 2018/0006791 A1* | 1/2018 | Marinier ............... | H04L 1/0073 |
| 2018/0034679 A1 | 2/2018 | Zhang et al. | |
| 2018/0255550 A1 | 9/2018 | Takeda et al. | |
| 2019/0028229 A1* | 1/2019 | Yeo ........................ | H04L 1/0058 |
| 2019/0082431 A1* | 3/2019 | Yi .......................... | H04L 5/0057 |
| 2019/0200330 A1* | 6/2019 | Wikström ............. | H04W 72/23 |
| 2019/0260440 A1* | 8/2019 | Davydov .............. | H04L 1/0003 |
| 2019/0364585 A1* | 11/2019 | Lee ................... | H04W 72/1289 |
| 2020/0028611 A1* | 1/2020 | Lee ....................... | H04L 1/0003 |
| 2020/0136746 A1* | 4/2020 | Li ........................ | H04L 1/0016 |
| 2020/0153538 A1* | 5/2020 | Chen ..................... | H04L 1/0023 |
| 2021/0368523 A1* | 11/2021 | Yoshioka .......... | H04W 72/0446 |

FOREIGN PATENT DOCUMENTS

| | | |
|---|---|---|
| TW | 201804831 A | 2/2018 |
| WO | WO-2017038895 A1 | 3/2017 |

OTHER PUBLICATIONS

International Search Report and Written Opinion—PCT/US2019/026620—ISA/EPO—dated Jul. 8, 2019 (183001WO).

Ericsson: "RAN1 Decisions for WI Shortened TTI and Processing Time for LTE (LTE_sTTIandPT)—per Topic", 3GPP Draft; R1-1721313, RAN1 Decisions for LTE sTTIandPT—per Topic (Revision of R1-I719247), 3rd Generation Partnership Project (3GPP), Mobile Competence Centre, 650, Route Des Lucioles; F-06921 Sophia-Antipolis Cedex, France, vol. RAN WG1, No. Reno. USA; Nov. 27, 2018-Dec. 1, 2018, Dec. 4, 2017 (Dec. 4, 2017), 42 Pages, XP051370717, Retrieved from the Internet: URL: http://www.3gpp.org/ftp/tsg_ran/WG1_RL1/TSGR1_91/Docs/ [retrieved on Dec. 4, 2017].

Taiwan Search Report—TW108112468—TIPO—dated Nov. 7, 2022 (183001TW).

* cited by examiner

TRANSPORT BLOCK SIZE DETERMINATION FOR A TRANSMISSION TIME INTERVAL

CROSS REFERENCES

The present application for patent claims the benefit of U.S. Provisional Patent Application No. 62/656,916 by HOSSEINI, et al., entitled "Transport Block Size Determination for a Transmission Time Interval," filed Apr. 12, 2018, assigned to the assignee hereof, and expressly incorporated by reference in its entirety herein.

BACKGROUND

The following relates generally to wireless communications, and more specifically to a transport block size (TB S) determination for a transmission time interval (TTI).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

During communications, wireless devices (e.g., base stations, UEs, etc.) may communicate control information and data using a transport block. Typically, these wireless devices may determine a TBS according to an amount of resources allocated and a modulation and coding scheme (MCS). A base station and/or a UE may attempt to determine which TBS of different TBS options may be desired to enable effective communication. Techniques for selecting an appropriate TBS option are desired.

SUMMARY

The described techniques relate to improved methods, systems, devices, and apparatuses that support a transport block size (TBS) determination for a transmission time interval (TTI) (which may be a shortened TTI (sTTI) in some cases). A base station may identify a UE capability to support a modulation scheme (e.g., 256QAM, 1024QAM). The base station may identify a plurality of TBS values that correspond to a size for a transport block based on the modulation scheme and map a scaled TBS value that is based on a length of a TTI for communicating with a user equipment (UE) to a TBS value of a plurality of TBS values options A signal communicated between the base station and the UE may provide an indication of whether the base station supports using one or more modulation schemes (e.g., 256QAM, 1024QAM).

The UE may determine whether it is configured to support the modulation scheme. The UE may identify a plurality of TBS values based on whether it is configured with the modulation scheme, which may be based on referencing a repository of TBS values (e.g., from a table), and identify a scaled TBS value that is based on a length of a TTI. The UE may then map the scaled TBS value to a TBS value of the plurality of TBS values. In some cases, the UE may disregard TBS values associated with the modulation scheme in a TBS lookup table based on determining that the base station and/or the UE do not support the modulation scheme, or that the UE is not configured with the modulation scheme, or a combination thereof. The UE may communicate, with the base station during the TTI, data on a transport block having a size corresponding to the mapped TBS value.

A method of wireless communication at UE is described. The method may include determining whether the UE is configured to support a modulation scheme, identifying a set of TBS values based on whether the UE is configured with the modulation scheme, identifying a scaled TBS value that is based on a length of a TTI, mapping the scaled TBS value to a TBS value of the set of TBS values, and communicating, with a base station during the TTI, data on a transport block having a size corresponding to the mapped TBS value.

An apparatus for wireless communication is described. The apparatus may include a processor, memory in electronic communication with the processor, and instructions stored in the memory. The instructions may be executable by the processor to cause the apparatus to determine whether the apparatus is configured to support a modulation scheme, identify a set of TBS values based on whether the apparatus is configured with the modulation scheme, identify a scaled TBS value that is based on a length of a TTI, map the scaled TBS value to a TBS value of the set of TBS values, and communicate, with a base station during the TTI, data on a transport block having a size corresponding to the mapped TBS value.

Another apparatus for wireless communication is described. The apparatus may include means for determining whether the apparatus is configured to support a modulation scheme, identifying a set of TBS values based on whether the apparatus is configured with the modulation scheme, identifying a scaled TBS value that is based on a length of a TTI, mapping the scaled TBS value to a TBS value of the set of TBS values, and communicating, with a base station during the TTI, data on a transport block having a size corresponding to the mapped TBS value.

A non-transitory computer-readable medium storing code for wireless communication at a UE is described. The code may include instructions executable by a processor to determine whether the UE is configured to support a modulation scheme, identify a set of TBS values based on whether the UE is configured with the modulation scheme, identify a scaled TBS value that is based on a length of a TTI, map the scaled TBS value to a TBS value of the set of TBS values, and communicate, with a base station during the TTI, data on a transport block having a size corresponding to the mapped TBS value.

Some examples of the method, apparatuses, and non-transitory computer-readable medium described herein may further include operations, features, means, or instructions for identifying a UE capability to support the modulation scheme. In some examples of the method, apparatuses, and non-transitory computer-readable medium described herein, determining whether the UE is configured to support the modulation scheme is based at least in part on the UE capability.

Some examples of the method, apparatuses, and non-transitory computer-readable medium described herein may further include operations, features, means, or instructions for receiving, from the base station, configuration information for the modulation scheme. In some examples of the method, apparatuses, and non-transitory computer-readable medium described herein, determining whether the UE is configured with the modulation scheme includes determining that the UE is not configured with the modulation scheme based at least in part on the configuration information. In some examples of the method, apparatuses, and non-transitory computer-readable medium described herein, identifying the plurality of TBS values is based at least in part on determining that the UE is not configured with the modulation scheme.

Some examples of the method, apparatuses, and non-transitory computer-readable medium described herein may further include operations, features, means, or instructions for identifying a TBS index based at least in part on a modulation coding scheme (MCS) index, identifying a TBS value in a TBS lookup table based at least in part on the TBS index and an allocation of resource blocks (RBs) for the TTI, and scaling the TBS value by a factor based at least in part on the length of the TTI, where the scaled TBS value is based at least in part on the scaling.

Some examples of the method, apparatuses, and non-transitory computer-readable medium described herein may further include operations, features, means, or instructions for receiving, from the base station, a signal indicating a base station capability to support the modulation scheme; and determining whether the base station supports the modulation scheme based at least in part on the signal, where mapping the scaled TBS value to the TBS value of the plurality of TBS values is based at least in part on whether the base station supports the modulation scheme.

Some examples of the method, apparatuses, and non-transitory computer-readable medium described herein may further include operations, features, means, or instructions for disregarding TBS values associated with the modulation scheme in a TBS lookup table based at least in part on determining that the base station does not support the modulation scheme, where mapping the scaled TBS value to the TBS value of the plurality of TBS values is based at least in part on the disregarding. In some examples of the method, apparatuses, and non-transitory computer-readable medium described herein, mapping the scaled TBS value to the TBS value of the plurality of TBS values is based at least in part on determining that the base station supports the modulation scheme and determining that the UE is not configured with the modulation scheme.

Some examples of the method, apparatuses, and non-transitory computer-readable medium described herein may further include operations, features, means, or instructions for disregarding one or more TBS values associated with the modulation scheme based at least in part on determining that the UE is not configured with the modulation scheme, where mapping the scaled TBS value to the TBS value of the plurality of TBS values is based at least in part on the disregarding.

In some examples of the method, apparatuses, and non-transitory computer-readable medium described herein, the signal indicating the base station capability includes a radio resource control (RRC) signaling, a UE-specific signaling, a system information block (SIB), or a downlink control information (DCI), or a combination thereof.

Some examples of the method, apparatuses, and non-transitory computer-readable medium described herein may further include operations, features, means, or instructions for receiving, from the base station, configuration information for the modulation scheme. In some examples of the method, apparatuses, and non-transitory computer-readable medium described herein, determining whether the UE is configured with the modulation scheme includes determining that the UE is configured with the modulation scheme based at least in part on the configuration information for the modulation scheme. In some examples of the method, apparatuses, and non-transitory computer-readable medium described herein, identifying the plurality of TBS values is based at least in part on determining that the UE is configured with the modulation scheme.

Some examples of the method, apparatuses, and non-transitory computer-readable medium described herein may further include operations, features, means, or instructions for identifying a TBS index based at least in part on an MCS index, identifying a TBS value based at least in part on the TBS index and an allocation of RBs for the TTI, and scaling the TBS value by a factor based at least in part on the length of the TTI. In some examples of the method, apparatuses, and non-transitory computer-readable medium described herein, the scaled TBS value is based at least in part on the scaling.

Some examples of the method, apparatuses, and non-transitory computer-readable medium described herein for identifying the plurality of TBS values may further include operations, features, means, or instructions for identifying the plurality of TBS values in a TBS lookup table based at least in part on whether the UE is configured with the modulation scheme. In some examples of the method, apparatuses, and non-transitory computer-readable medium described herein, mapping the scaled TBS value to the TBS value of the plurality of TBS values includes mapping the scaled TBS value to the TBS value of the plurality of TBS values in the TBS lookup table.

Some examples of the method, apparatuses, and non-transitory computer-readable medium described herein for determining whether the UE is configured with the modulation scheme may further include operations, features, means, or instructions for determining whether the UE is configured with the modulation scheme in at least one band associated with a band-of-band combination (BoBC). In some examples of the method, apparatuses, and non-transitory computer-readable medium described herein, identifying the plurality of TBS values is based at least in part on whether the UE is configured with the modulation scheme in the at least one band associated with the BoBC.

Some examples of the method, apparatuses, and non-transitory computer-readable medium described herein may further include operations, features, means, or instructions for identifying a TBS value based at least in part on a TBS index and an allocation of RBs for the TTI, and scaling the TBS value by a factor, where mapping the scaled TBS value to the TBS value of the plurality of TBS values is based at least in part on the modulation scheme for the BoBC.

Some examples of the method, apparatuses, and non-transitory computer-readable medium described herein may further include operations, features, means, or instructions for determining that the UE is not configured with the modulation scheme in the at least one band or another band associated with the BoBC, and identifying a TBS value in a TBS lookup table based at least in part on the UE not being configured with the modulation scheme in the at least one band or another band associated with the BoBC. In some examples of the method, apparatuses, and non-transitory computer-readable medium described herein, identifying the TBS values further includes disregarding TBS values corresponding to the modulation scheme associated with the BoBC.

Some examples of the method, apparatuses, and non-transitory computer-readable medium described herein may further include operations, features, means, or instructions for scaling the TBS value associated with the band, and mapping the scaled TBS value associated with the band to a TBS value of the plurality of TBS values in the TBS lookup table, the TBS lookup table including TBS values corresponding to the modulation scheme associated with the BoBC.

Some examples of the method, apparatuses, and non-transitory computer-readable medium described herein may further include operations, features, means, or instructions for scaling the TBS value associated with the band, and mapping the scaled TBS value associated with the band to a TBS value of the plurality of TBS values in the TBS lookup table for the band, where mapping the scaled TBS value further includes disregarding TBS values in the TBS lookup table that are related to the modulation scheme associated with the BoBC.

Some examples of the method, apparatuses, and non-transitory computer-readable medium described herein may further include operations, features, means, or instructions for determining that the UE is not configured with the modulation scheme for the BoBC, determining that the UE is configured with the modulation scheme for a second BoBC, and identifying, for the BoBC, a TBS value in a TBS lookup table based at least in part on determining that the UE is not configured with the modulation scheme for the BoBC and determining that the UE is configured with the modulation scheme for a second BoBC. In some examples of the method, apparatuses, and non-transitory computer-readable medium described herein, identifying the TBS values, for the BoBC, further includes including TBS values corresponding to the modulation scheme supported by the second BoBC.

Some examples of the method, apparatuses, and non-transitory computer-readable medium described herein may further include operations, features, means, or instructions for scaling the TBS value associated with the BoBC, and mapping the scaled TBS value, associated with the BoBC, to a TBS value of the plurality of TBS values in the TBS lookup table, the TBS lookup table including or excluding TBS values corresponding to the modulation scheme associated with the second BoBC.

Some examples of the method, apparatuses, and non-transitory computer-readable medium described herein may further include operations, features, means, or instructions for determining that the UE is configured with the modulation scheme in at least one band associated with the BoBC, determining that the UE is not configured with the modulation scheme in at least another band associated with the BoBC or for another BoBC, or both, and identifying a TBS value in a TBS lookup table, for the at least another band associated with the BoBC or for another BoBC, or both based at least in part on the UE not being configured with the modulation scheme in the at least another band associated with the BoBC or for another BoBC. In some examples of the method, apparatuses, and non-transitory computer-readable medium described herein, identifying the TBS values further includes disregarding TBS values corresponding to the modulation scheme associated with the at least one band associated with the BoBC.

Some examples of the method, apparatuses, and non-transitory computer-readable medium described herein may further include operations, features, means, or instructions for scaling the TBS value associated with the at least another band associated with the BoBC or for another BoBC, or both, and mapping the scaled TBS value, associated with the at least another band associated with the BoBC or for another BoBC, or both, to a TBS value of the plurality of TBS values in the TBS lookup table, the TBS lookup table including TBS values corresponding to the modulation scheme associated with the at least one band associated with the BoBC.

Some examples of the method, apparatuses, and non-transitory computer-readable medium described herein may further include operations, features, means, or instructions for scaling the TBS value associated with the at least another band associated with the BoBC or for another BoBC, or both; and mapping the scaled TBS value, associated with the at least another band associated with the BoBC or for another BoBC, or both, to a TBS value of the plurality of TBS values in the TBS lookup table, the TBS lookup table disregarding TBS values corresponding to the modulation scheme associated with the at least one band associated with the BoBC.

In some examples of the method, apparatuses, and non-transitory computer-readable medium described herein, communicating, with the base station during the TTI, includes a downlink communication, an uplink communication, or both.

A method of wireless communications at a base station is described. The method may include identifying a UE capability to support a modulation scheme, identifying a set of TBS values based on the modulation scheme, mapping a scaled TBS value that is based on a length of a TTI for communicating with the UE to a TBS value of the set of TBS values, and communicating, with the UE during the TTI, data on a transport block having a size corresponding to the mapped TBS value.

An apparatus for wireless communications is described. The apparatus may include a processor, memory in electronic communication with the processor, and instructions stored in the memory. The instructions may be executable by the processor to cause the apparatus to identify a UE capability to support a modulation scheme, identify a set of TBS values based on the modulation scheme, map a scaled TBS value that is based on a length of a TTI for communicating with the UE to a TBS value of the set of TBS values, and communicate, with the UE during the TTI, data on a transport block having a size corresponding to the mapped TBS value.

Another apparatus for wireless communications is described. The apparatus may include means for identifying a UE capability to support a modulation scheme, identifying a set of TBS values based on the modulation scheme, mapping a scaled TBS value that is based on a length of a TTI for communicating with the UE to a TBS value of the set of TBS values, and communicating, with the UE during the TTI, data on a transport block having a size corresponding to the mapped TBS value.

A non-transitory computer-readable medium storing code for wireless communications is described. The code may include instructions executable by a processor to identify a UE capability to support a modulation scheme, identify a set of TBS values based on the modulation scheme, map a scaled TBS value that is based on a length of a TTI for communicating with the UE to a TBS value of the set of TBS values, and communicate, with the UE during the TTI, data on a transport block having a size corresponding to the mapped TBS value.

Some examples of the method, apparatuses, and non-transitory computer-readable medium described herein may further include operations, features, means, or instructions for transmitting, to the UE, a signal indicating a base station capability to support the modulation scheme, where communicating data on the transport block having the size corresponding to the mapped TBS value may be based on transmitting the signal.

In some examples of the method, apparatuses, and non-transitory computer-readable medium described herein, the radio signal indicating the base station capability includes an RRC signaling, a UE-specific signaling, a SIB, or a DCI, or a combination thereof.

Some examples of the method, apparatuses, and non-transitory computer-readable medium described herein may further include operations, features, means, or instructions for configuring the UE with the modulation scheme based on transmitting, to the UE, configuration information for the modulation scheme, where communicating data on the transport block having the size corresponding to the mapped TBS value may be based on configuring the UE with the modulation scheme.

Some examples of the method, apparatuses, and non-transitory computer-readable medium described herein may further include operations, features, means, or instructions for identifying the modulation scheme based on a base station capability, determining a MCS index and an allocation of RBs for the UE based on the modulation scheme and transmitting the MCS index and the allocation of RBs to the UE using the transport block, where communicating data on the transport block having the size corresponding to the mapped TBS value may be based on transmitting the MCS index and the allocation of RBs to the UE using the transport block. In some examples of the method, apparatuses, and non-transitory computer-readable medium described herein, the TTI includes a sTTI.

DETAILED DESCRIPTION

Figure 1:
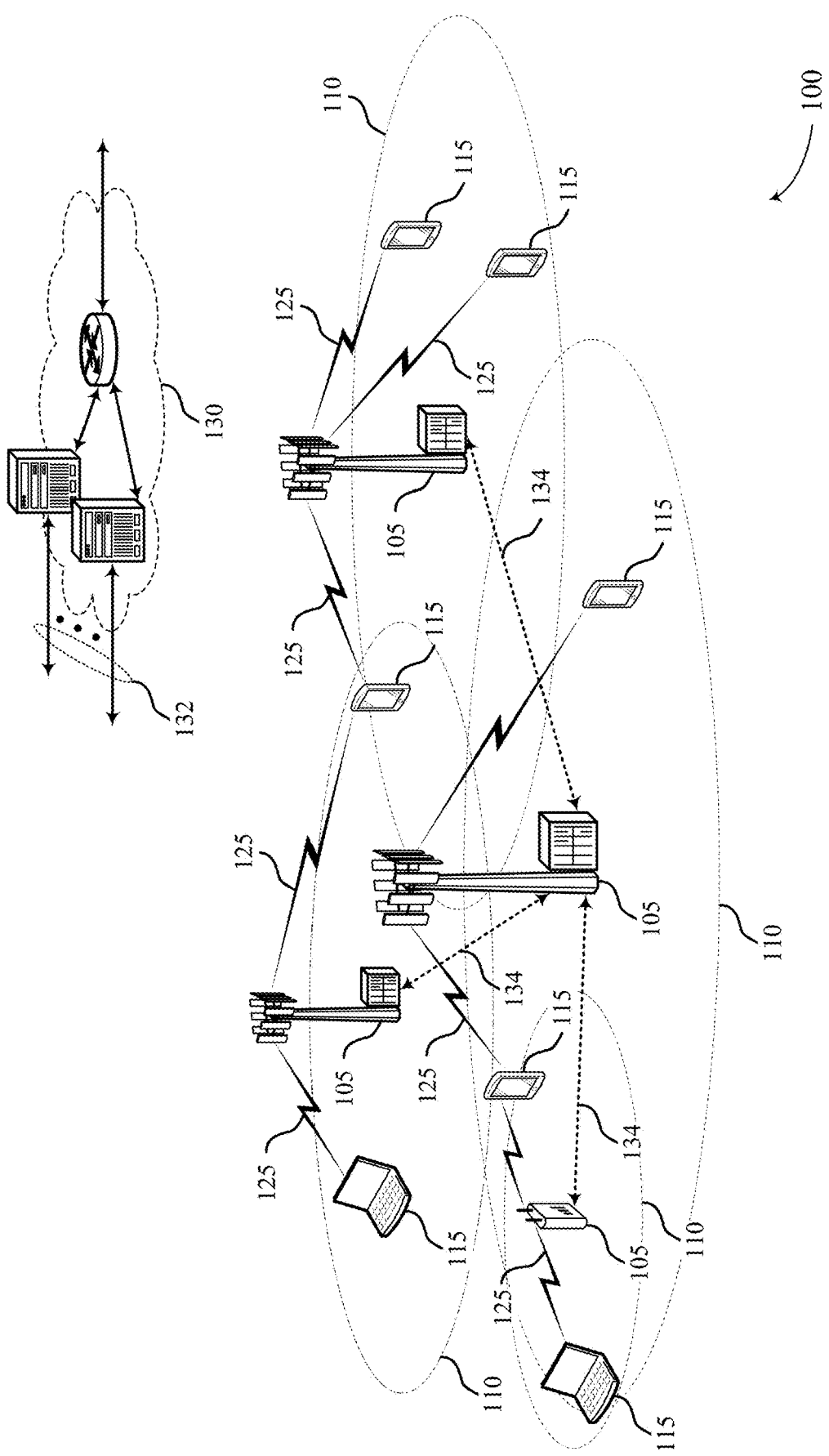
FIG. 1 illustrates an example of a wireless communications system that supports transport block size (TBS) determination for a transmission time interval (TTI) in accordance with aspects of the present disclosure.

A base station may communicate (e.g., perform a radio resource control (RRC) procedure) with a user equipment (UE). As part of the communication, the base station may configure the UE through downlink transmissions (e.g., RRC signaling). For example, the base station may configure the UE with a modulation coding scheme (MCS) and resource allocation (e.g., time and frequency resources). The UE may identify and report its UE capabilities, so that the base station can determine a configuration for the UE. The base station may receive UE capability information per UE or per band-of-band combination (BoBC), among other options. The UE capability may, in some cases, be an indication of a modulation scheme supported by the UE. For example, a UE capability may indicate that the UE supports 16QAM, 64QAM, 256QAM, or 1024QAM, or a combination thereof, among other options, in downlink, or uplink, or both.

The UE may communicate control information and data using a transport block during a transmission time interval (TTI). The control information and data may be communicated to the base station according to the modulation scheme and allocated resources. For example, the UE may communicate control information and data over a number of resource blocks (RBs) and using a modulation scheme (e.g., 256QAM or 1024QAM) that is determined based on the configuration information. The UE may determine a size of the transport block using the configuration information indicating the modulation scheme and the resource allocation.

The UE may determine a size of a transport block by accessing a source location, which may in some cases be or include a lookup table. The lookup table may be a TBS-specific lookup table. The UE may receive an MCS index ($I_{MCS}$) from the base station, for example as part of the configuration information, and may map the $I_{MCS}$ to a TBS index ($I_{TBS}$) in the lookup table. The UE may identify a TBS value (i.e., a size for a transport block) by mapping the $I_{TBS}$ and $N_{PRB}$ within the lookup table. $N_{PRB}$ may relate to a number of allocated RBs. In some cases, the UE may initiate additional processing of the TBS value. For example, the UE may scale the TBS value by a factor that is dependent on a length of a TTI. The UE may then map the scaled TBS value to a TBS value in the lookup table.

In some cases, more than one valid TBS value (e.g., more than one potential TBS value option) may correspond to the scaled TBS value in the lookup table, as a result of the mapping. In this case, the UE may have to determine which of the valid TBS values to select for the scaled TBS value. To provide for an effective coordination of mapping a scaled TBS value to a TBS value option (e.g., in the lookup table), one or more entries (e.g., TBS values) may be added or disregarded based on UE capability, base station capability (e.g., which may be based on signaling between the base station and the UE indicating whether the base station supports one or more modulation schemes), and/or whether the UE is configured to support the modulation scheme, as described herein.

Aspects of the disclosure are initially described in the context of a wireless communications system. Process flows implementing TBS determination techniques are then discussed. Aspects of the disclosure are further illustrated by and described with reference to apparatus diagrams, system diagrams, and flowcharts that relate to TBS determination for a TTI.

FIG. 1 illustrates an example of a wireless communications system 100 that supports TBS determination for a TTI in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $Tf=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may identify a UE capability to support a modulation scheme. The base station 105 may identify a plurality of TBS values based on the modulation scheme and map a scaled TBS value that is based on a length of a TTI for communicating with the UE to a TBS value of the plurality of TBS values. A UE 115 may determine whether the UE 115 is configured to support the modulation scheme. The UE 115 may identify a plurality of TBS values based on whether the UE is configured with the modulation scheme, and identify a scaled TBS value that is based on a length of a TTI. The UE 115 may then map the scaled TBS value to a TBS value of the plurality of TBS values. In some cases, the UE 115 may disregard TBS values associated with the modulation scheme in a TBS lookup table based on determining that the base station 105 and/or the UE 115 do not support the modulation scheme, or the UE 115 is not configured with the modulation scheme, or a combination thereof. The UE 115 may communicate, with the base station 105 during the TTI, data on a transport block having a size corresponding to the mapped TBS value.

Figures 2A, 2B:
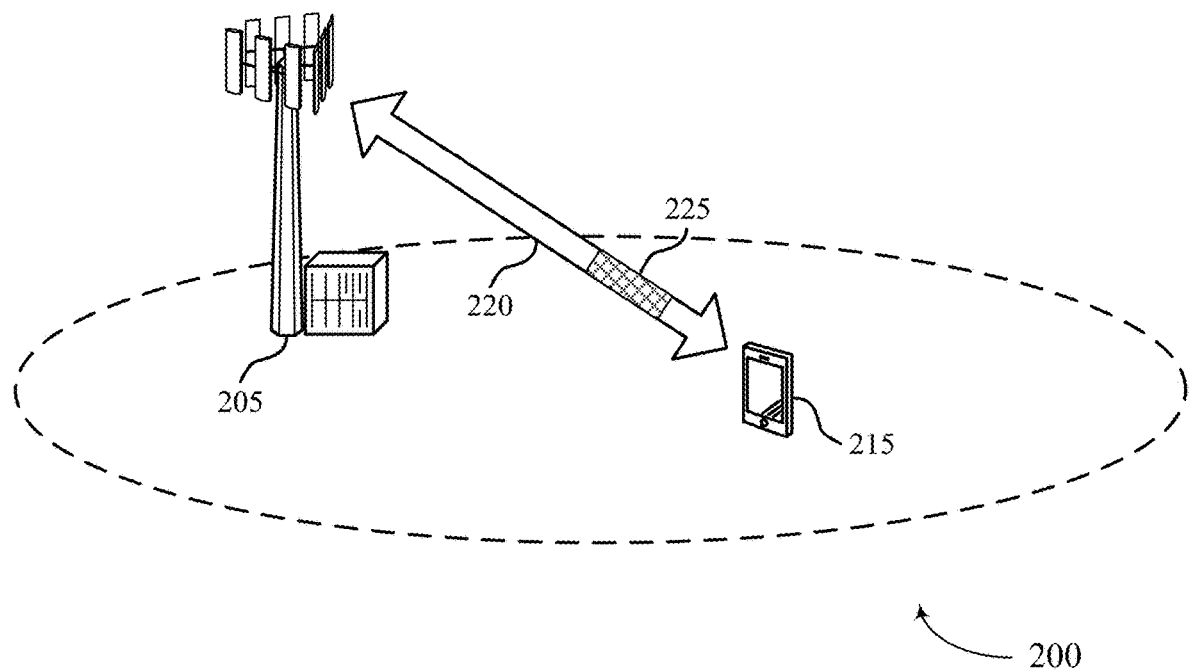
FIG. 2A illustrates an example of a wireless communications system that supports TBS determination for a TTI in accordance with aspects of the present disclosure.
FIG. 2B illustrates an example of a table that supports TBS determination for a TTI in accordance with aspects of the present disclosure.

FIG. 2A illustrates an example of a wireless communications system 200 that supports TBS determination for a TTI in accordance with various aspects of the present disclosure. The wireless communications system 200 may also support performing a TBS mapping in an efficient manner to enhance communication and reduce latency in the wireless communications system 200. In some cases, the TBS mapping, in the wireless communications system 200, may be supported for downlink communications, or uplink communications, or both.

In some examples, the wireless communications system 200 may implement aspects of the wireless communications system 100. The wireless communications system 200 may include a base station 205 and a UE 215, which may be examples of the corresponding devices described with reference to FIG. 1. The wireless communications system 200 may operate according to a radio access technology (RAT) such as 4G LTE or 5G NR, although techniques described herein may be applied to any RAT and to systems that may concurrently use two or more different RATs that support beamformed transmissions (e.g., 4G LTE and 5G NR).

The base station 205 may perform a communication procedure (e.g., an RRC procedure, such as a cell acquisition procedure, random access procedure, RRC connection procedure, RRC configuration procedure) with the UE 215. The base station 205 may be configured with multiple antennas, which may be used for directional or beamformed transmissions. As part of the communication procedure, the base station 205 and the UE 215 may establish a bi-directional communication link 220 for communication. The base station 205 may also configure the UE 215 through downlink transmissions (e.g., RRC signaling), as part of the communication procedure. For example, the base station 205 may configure the UE 215 with an MCS and resource allocation (e.g., time and frequency resources). An MCS may also be referred to herein as or be an example of a modulation scheme.

The UE 215 may identify and report its UE capabilities, so that the base station 205 can determine a configuration for the UE 215. In some examples, the base station 205 may receive UE capability reporting per UE or per BoBC. For example, if the UE 215 is supporting a single band (e.g., frequency band), the UE 215 may identity and reports its UE capability to the base station 205, which it may use to configure the UE 215. Alternatively, if the UE 215 supports a BoBC (e.g., two or more frequency bands), the UE 215 may report its UE capabilities for each band associated with the BoBC, separately or concurrently.

The UE capability may be an indication of a modulation scheme supported by the UE 215. For example, a UE capability may indicate that the UE 215 supports 16QAM, 64QAM, 256QAM, or 1024QAM, or a combination thereof. In some examples, UE capability reporting (e.g., per UE) may be for a specific supported modulation scheme (e.g., 256QAM), and UE capability reporting per BoBC may be for another supported modulation scheme (e.g., 1024QAM).

In some examples, the base station 205 may configure the UE 215 with a modulation scheme and resource allocation based on a reported UE capability. The base station 205 may transmit configuration information indicating the modulation scheme and the resource allocation in a downlink transmission to the UE 215 via the bi-directional communication link 220. For example, the base station 205 may transmit downlink control information (DCI) on a physical control channel (PDCCH). In some examples, the base station 205 may transmit UE-specific scheduling assignments for downlink resource allocation, uplink grants, physical random access channel (PRACH) responses, uplink power control commands, and common scheduling assignments for signaling messages (e.g., such as system information blocks (SIBs)) on the PDCCH. The base station 205 may transmit the configuration information during one or more symbols within a given a transmission time interval (TTI) or a shortened TTI (sTTI) (e.g., a TTI that is shorter than a standard TTI).

A TTI or an sTTI may be part of a resource grid that may correspond to a system bandwidth that the base station 205 may allocate to the UE 215. A resource element in a resource grid, may span one symbol by one sub-carrier. Each resource element may carry two, four or six physical channel bits. Resource elements may be grouped into resource blocks (RBs), each of which may span 180 kHz (e.g., 12 sub-carriers). The base station 205 may allocate RBs to the UE 215, by allocating the symbols and sub-carriers within each TTI or sTTI in units of RBs to the UE 215. Each TTI or sTTI may span a number of modulation symbol periods (e.g., 0-14 OFDM symbols) and a number of sub-carriers within a bandwidth.

The UE 215 may communicate, to the base station 205, control information and data using a transport block 225 during a TTI. The control information and data may be communicated to the base station 205 according to the modulation scheme and allocated resources. For example, the UE 215 may communicate control information and data over a number of RBs and using a modulation scheme (e.g., 256QAM, 1024QAM) that may be determined based on the configuration information. The UE 215 may determine a size of the transport block 225, prior to communicating with the base station 205 on an uplink communication. Alternatively, the base station 205 may determine a size of a transport block based on UE capability for downlink communication.

The UE 215 may determine the size of the transport block 225 using the configuration information indicating the modulation scheme and the resource allocation, received from the base station 205. In some cases, the UE 215 may determine a size of a transport block by consulting at least source (which may, in some cases, be or include a lookup table). The lookup table may be a TBS-specific lookup table, which may be stored in local memory of the UE 215, or retrieved from a remote memory (e.g., remote database). In some cases, the base station 205 may configure the UE 215 with multiple lookup tables.

FIG. 2B illustrates an example of a table 245, which may be an example of source information, that supports TBS determination for a TTI in accordance with various aspects of the present disclosure. The UE 215 may receive an MCS index ($I_{MCS}$) from the base station 205, for example as part of the configuration information, and map the $I_{MCS}$ to a TBS index ($I_{TBS}$) in a lookup table. Subsequently, the UE 215 may identify a TBS value (i.e., a size for a transport block) in a lookup table by mapping the $I_{TBS}$ and $N_{PRB}$ within another lookup table. $N_{PRB}$ relates to a number of allocated RBs. For example, the UE 215 may identify a TBS value in the table 245 by mapping an $I_{TBS}$ 250 and $N_{PRB}$ 255. The UE 215 may configure the transport block 225 to a size (e.g., length) based on the identified TBS value in the table 245. As a result, the UE 215 may communicate, to the base station 205 during a TTI, control information and data using the transport block 225 having a size corresponding to the mapped TBS value.

In some examples, a lookup table may be specific to a modulation scheme. For example, a first lookup table may correspond to 64QAM, a second lookup table may correspond to 256QAM, and a third lookup table may correspond to 1024QAM. Additionally, or alternatively, a lookup table may correspond to a combination of modulation scheme, for example, 256QAM and 1024QAM. Thereby, a single lookup table may have TBS values that correspond to multiple modulation schemes (e.g., at least 256QAM and 1024QAM).

In some cases, the UE 215 may apply additional processing to the TBS value. For example, in the case that the UE 215 is communicating with the base station 205 during an sTTI, the UE 215 may scale a TBS value by a factor that is dependent on a length of the sTTI. The UE 215 may then map the scaled TBS value to a TBS value in the lookup table. For example, the UE 215 may identify a TBS value by mapping the scaled TBS value in the table 245. In some cases, mapping the scaled TBS value may be based on the $N_{PRB}$ being within a specific range (e.g., $1 \leq N_{RB} \leq 55$, $1 \leq N_{PRB} \leq 36$, $1 \leq N_{PRB} \leq 27$) or a number of spatial layers for which the scaled TBS value is being mapped to by the UE 215, or both. For example, the UE 215 may select a lookup table from a plurality of lookup tables based on a number of spatial layers the scaled TBS value is being mapped to by the UE 215 and the $N_{PRB}$ being within a specific range. The UE 215 may map the scaled TBS value to a TBS value in the selected lookup table.

In some cases, more than one valid TBS value may correspond to the scaled TBS value in the selected lookup table as a result of the mapping. In this case, the UE 215 may have to determine which of the valid TBS values (e.g., TBS value options) to select for the scaled TBS value. In one example, the UE 215 may select a TBS value from the valid TBS values that is larger compared to other TBS values of the valid TBS values. This technique may, however, be a less effective approach in TBS determination. Therefore, the base station 205 and the UE 215 may be able to perform a more efficient coordination of mapping a TBS value in a lookup table for communication with a base station.

According to the described techniques herein, one or more entries (e.g., TBS values) in the source (e.g., a lookup table) may be added or disregarded based on UE capability and/or whether the UE 215 is configured to support a modulation scheme. The UE 215 or the base station 205, or both may add or disregard one or more entries (e.g., TBS values) in the source (e.g., a lookup table) when determining a TBS for both downlink communications, or uplink communications, or both. For example, a lookup table may have TBS values that correspond to 256QAM and 1024QAM. Based on the UE capability and/or whether the UE 215 is configured to support a modulation scheme (e.g., 256QAM and/or 1024QAM) TBS values in the lookup table may be added or disregarded.

In one case, the UE 215 may not support a modulation scheme. For example, the UE 215 may not support 256QAM and/or 1024QAM. The UE 215 may determine that it does not support these modulation schemes based on UE capability. In some cases, TBS values associated with the unsupported modulation scheme may be disregarded from the lookup table. For example, the UE 215 may disregard TBS values 260 when mapping a TBS value based on $I_{TBS}$ and $N_{PRB}$ and mapping a scaled version of the TBS value in the table 245.

The UE 215 may identify a plurality of TBS values in a lookup table that correspond to a modulation scheme supported by the UE 215. As such, the UE 215 may identify a plurality of TB S values and map to a TBS value of the plurality that are associated with a supported modulation scheme. In some examples, if the UE 215 supports 1024QAM it may also support 256QAM.

The UE 215 may, in some cases, support a modulation scheme and be configured by the base station 205 to support the modulation scheme. For example, the UE 215 may support 256QAM and be configured to support 256QAM. In this case, TBS values associated with the supported and configured modulation scheme may be part of the lookup table for mapping both a TBS value based on $I_{TBS}$ and $N_{PRB}$ and mapping a scaled version of the TBS value. Alternatively, the UE 215 may support a modulation scheme but may not be configured by the base station 205 to support the modulation scheme. For example, the UE 215 may support 256QAM but may not be configured to support 256QAM. In these examples, TBS values associated with the modulation scheme may be disregarded from a lookup table when mapping a TBS value based on $I_{TBS}$ and $N_{PRB}$. After mapping to a TBS value, the UE 215 may scale the TBS value. Following, when mapping the scaled TBS value to a TBS value in the lookup table, the UE 215 may also disregard the TBS values associated with a modulation scheme. Alternatively, the UE 215 may determine to include these TBS values, when mapping the scaled TBS value, based on a base station capability.

The base station 205 may transmit a signal indicating a base station capability to the UE 215. The base station capability may indicate whether the base station 205 supports the modulation scheme supported by the UE 215, when the UE 215 is not configured with the modulation scheme. The base station 205 may signal the base station capability via one or more methods (e.g., RRC signaling), UE-specific signaling, in a system information block (SIB), or a DCI, or a combination thereof. In some cases, this signaling may be in addition to other signaling that is already performed or may be included in current signaling procedures and practices. By signaling the base station capability, the UE 215 may be aware of a modulation scheme supported by the base station 205, and as such handle TBS values in a lookup table appropriately. For example, if the UE 215 determines that the base station 205 supports a modulation scheme of the UE 215, it may consider the TBS values associated with the modulation scheme when mapping the scaled TBS value. Otherwise, the UE 215 may disregard the TBS values associated with the modulation scheme.

In some cases, the UE 215 may identify that it supports the modulation scheme and determine whether it is configured with the modulation scheme for a BoBC. For example, the UE 215 may identify that it supports a 1024QAM in at least one band associated with a BoBC, and determine that it is also configured to support the 1024QAM. If the UE 215 supports and is configured with the modulation scheme in the BoBC, TBS values associated with the modulation scheme may be part of the lookup table for mapping both a TBS value based on $I_{TBS}$ and $N_{PRB}$ and mapping a scaled version of the TBS value for the at least one band.

For other bands of the BoBC or for a second BoBC, the UE 215 may disregard TBS values associated with the modulation scheme when mapping a TBS value for the other bands based on $I_{TBS}$ and $N_{PRB}$; for example, because the UE 215 may not support the modulation scheme in the other bands or in the second BoBC. The UE 215 may scale the mapped TBS value. In some cases, the UE 215 may either support or disregard TBS values associated with the modulation scheme from a lookup table when mapping the scaled TBS value for the other bands or the second BoBC.

For example, a first BoBC may include a first band and a second band, and a second BoBC may include a third band and a fourth band. The UE 215 may identify and determine that it supports and is configured with 1024QAM for the first band but does not support 1024QAM for the second band or the second BoBC, or both. Based on supporting and being configured with the 1024QAM for the first band, the UE 215 may support TBS values associated with the 1024QAM when mapping both a TBS value based on $I_{TBS}$ and $N_{PRB}$ and mapping a scaled version of the TBS value. For the second band or the second BoBC, however, the UE 215 may disregard the TBS values associated with the 1024QAM when mapping a TBS value based on $I_{TBS}$ and $N_{PRB}$. The UE 215 may scale the mapped TBS value, and map the scaled TBS value to a TBS value in the lookup table. The UE 215 may choose to either not support or support TBS values associated with the 1024QAM when mapping the scaled TBS value in the lookup table, for the second band or the second BoBC, or both, because the UE 215 supports the 1024QAM in the first band. That is, the UE 215 may already know TBS values for the 1024QAM and therefore not require any additional processing for including these TBS values when mapping the scaled TBS value.

In some cases, the UE 215 may identify that it supports the modulation scheme and determine that it is not configured with the modulation scheme in the BoBC. For example, the UE 215 may identify that it supports a 1024QAM in at least one band associated with the BoBC, but is not configured to support the 1024QAM. If the UE 215 supports but is not configured with the modulation scheme in the BoBC, the UE 215 may disregard TBS values associated with the modulation scheme when mapping a TBS value in a lookup table based on $I_{TBS}$ and $N_{PRB}$.

The UE 215 may scale the mapped TBS value. To map the scaled TBS value, the UE 215 may determine to include or disregard the TBS values corresponding to the modulation scheme when mapping the scaled TBS value within the lookup table. In an example, the UE 215 may disregard the TBS values corresponding to the modulation scheme based on any one band of the BoBC s not being configured to support the modulation scheme. For example, a first band may be configured to support the modulation scheme, but a second band may not be configured to support the modulation scheme. In this example, the UE 215 disregard the TBS values corresponding to the modulation scheme when mapping the scaled TBS value within the lookup table, because the second band is not configured. Alternatively, the UE 215 may include the TBS values corresponding to the modulation scheme based on base station capability indicating whether the base station 205 supports the modulation scheme.

The UE 215 may communicate, with the base station 205 in the BoBC, data on a transport block having a size corresponding to the mapped TBS value. By providing a more efficient coordination of mapping a TBS value in a lookup table, communication is enhanced and latency is reduced in the wireless communications system 200.

Figure 3:
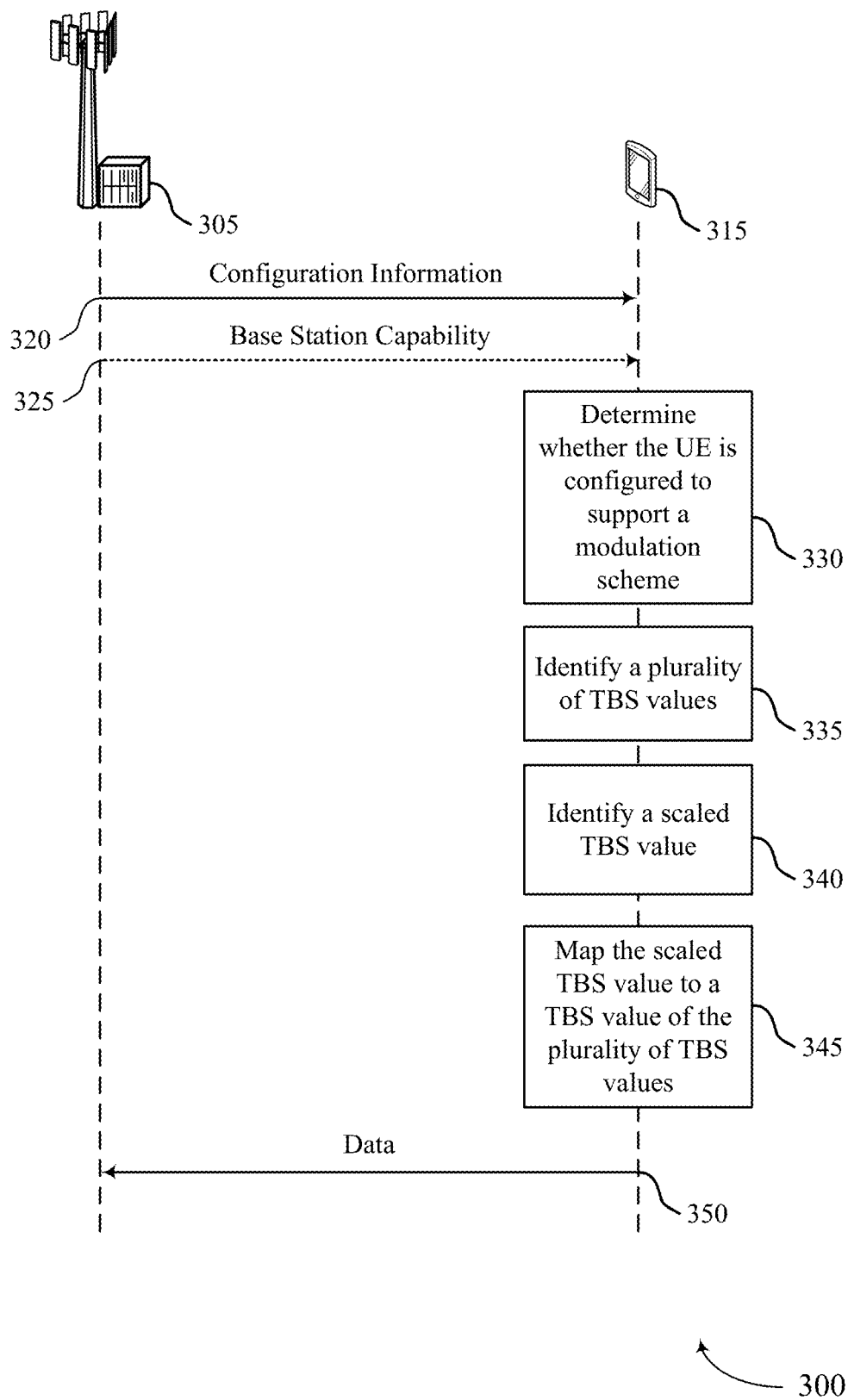
FIGS. 3 and 4 illustrate examples of a process flow that supports TBS determination for a TTI in accordance with aspects of the present disclosure.

FIG. 3 illustrates an example of a process flow 300 that supports TBS determination for a TTI in accordance with various aspects of the present disclosure. In some examples, the process flow 300 may implement aspects of the wireless communications system 100 and 200. Base station 305 and UE 315 may be examples of the corresponding devices described with reference to FIGS. 1 and 2.

In the following description of the process flow 300, the operations between the base station 305 and the UE 315 may be transmitted in a different order than the exemplary order shown, or the operations performed by the base station 305 and the UE 315 may be performed in different orders or at different times. Certain operations may also be left out of the process flow 300, or other operations may be added to the process flow 300.

In some examples, the process flow 300 may commence with the base station 305 establishing a connection with the UE 315 (e.g., performing a cell acquisition procedure, a random access procedure, an RRC connection procedure, an RRC configuration procedure).

At 320, the base station 305 may transmit configuration information to the UE 315. For example, the base station 305 may schedule and allocate resources to the UE 315, and indicate the resources and a modulation scheme (e.g., 256QAM, 1024QAM) in the configuration information.

At 325, the base station 305 may also, optionally, transmit base station capability to the UE 315. The base station capability may indicate a modulation scheme supported by the base station 305. The base station 305 may signal the base station capability via one or more methods (e.g., RRC signaling), UE-specific signaling, in a SIB, or a DCI, or a combination thereof. In some cases, this signaling may be in addition to other signaling that is already performed or may be included in current signaling procedures and practices. For example, the base station 305 may transmit the base station capability as part of the configuration information (at 320). By signaling the base station capability, the UE 315 may be aware of a modulation scheme supported by the base station 305, and as such handle TBS values in a lookup table appropriately. For example, the UE 315 may already support 256QAM but may wait to be configured by the base station 305 with the 256QAM, before using 256QAM for communications and mapping a TBS value to at least one TBS value of a plurality of TBS values corresponding to 256QAM.

At 330, the UE 315 may determine whether the UE 315 is configured to support a modulation scheme. For example, based on the configuration information, the UE 315 may determine whether it is configured to support the modulation scheme. For example, the UE 315 may identify whether a 256QAM or 1024QAM was signaled in the configuration information.

At 335, the UE 315 may identify a plurality of TBS values. In some cases, the plurality of TBS values may be based on determining whether the UE 315 is configured with the modulation scheme. For example, the UE 315 may identify TBS values in a lookup table that correspond to the supported modulation scheme (e.g., 256QAM and/or 1024QAM).

At 340, the UE 315 may identify a scaled TBS value. For example, the UE 315 may identify a $I_{TBS}$ based on a $I_{MCS}$, and identify a TBS value based on the $I_{TBS}$ and an allocation of $N_{RB}S$ for the TTI. The UE 315 may scale the TBS value by a factor based on a length of a TTI.

At 345, the UE 315 may map the scaled TBS value to a TBS value of the plurality of TBS values. In an example, the UE 315 may add or disregard one or more entries (e.g., TBS values) in a lookup table based on UE capability and/or whether the UE 315 is configured to support a modulation scheme. The UE 315 may add or disregard one or more entries (e.g., TBS values) in the lookup table when determining a TBS for both downlink communications, or uplink communications, or both. For example, a lookup table may have TBS values that correspond to 256QAM and 1024QAM. Based on the UE capability and/or whether the UE 315 is configured to support a modulation scheme (e.g., 256QAM and/or 1024QAM) TBS values in the lookup table may be added or disregarded.

At 350, the UE 315 may communicate, with the base station 305 during the TTI, data on a transport block having a size corresponding to the mapped TBS value.

Figure 4:
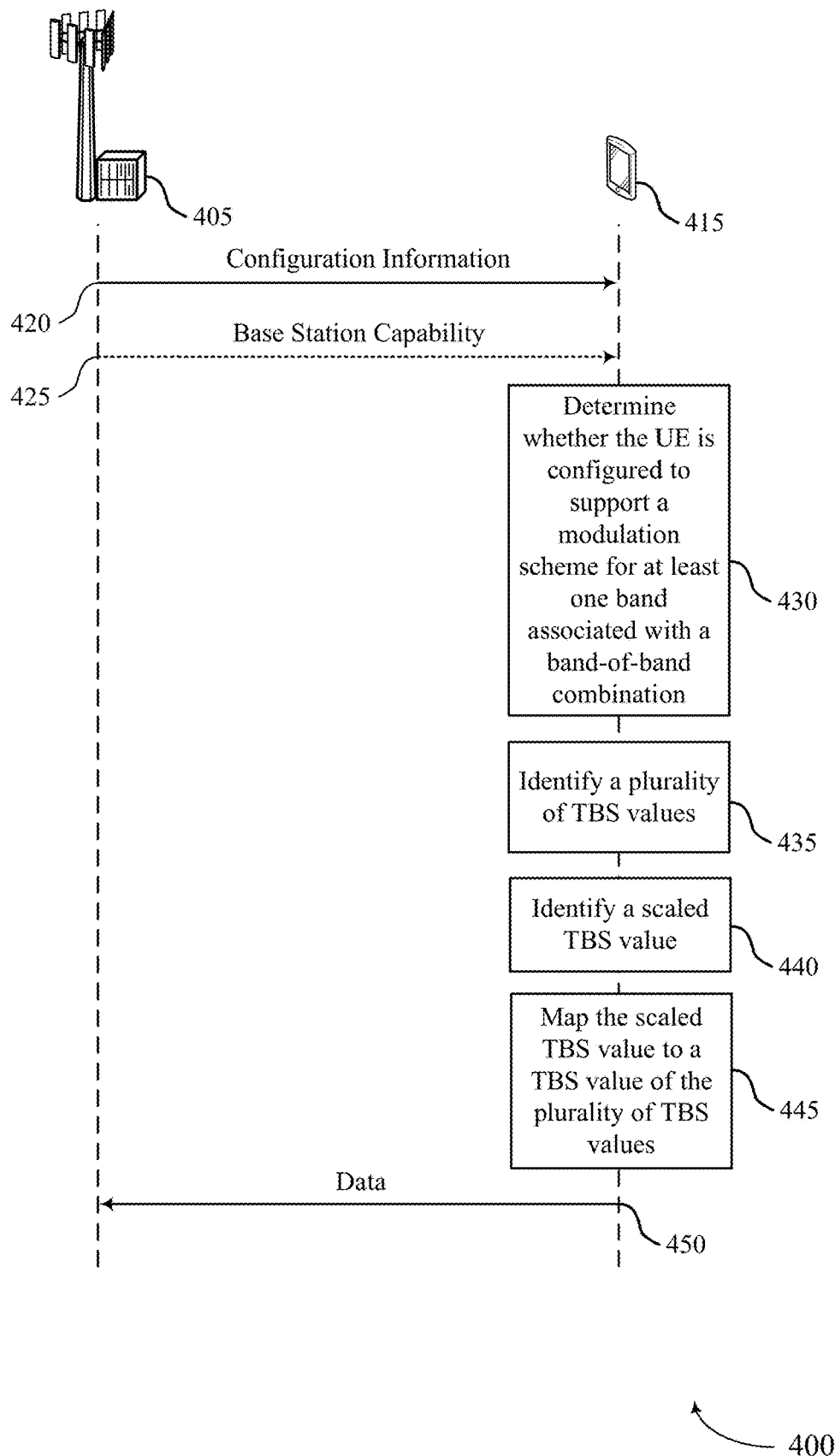

FIG. 4 illustrates an example of a process flow 400 that supports TBS determination for a TTI in accordance with various aspects of the present disclosure. In some examples, the process flow 400 may implement aspects of the wireless communications system 100 and 200. Base station 405 and UE 415 may be examples of the corresponding devices described with reference to FIGS. 1 and 2.

In the following description of the process flow 400, the operations between the base station 405 and the UE 415 may be transmitted in a different order than the exemplary order shown, or the operations performed by the base station 405 and the UE 415 may be performed in different orders or at different times. Certain operations may also be left out of the process flow 400, or other operations may be added to the process flow 400.

In some examples, the process flow 400 may commence with the base station 405 establishing a connection with the UE 415 (e.g., performing a cell acquisition procedure, a random access procedure, an RRC connection procedure, an RRC configuration procedure).

At 420, the base station 405 may transmit configuration information to the UE 415. For example, the base station 405 may schedule and allocate resources to the UE 415, and indicate the resources and a modulation scheme in the configuration information.

At 425, the base station 405 may, optionally, transmit base station capability to the UE 415. The base station capability may indicate a modulation scheme supported by the base station 405. The base station 405 may, for example, signal the base station capability via one or more methods RRC signaling, UE-specific signaling, in a SIB, or a DCI, or a combination thereof. In some cases, this signaling may be in addition to other signaling that is already performed or may be included in current signaling procedures and practices.

For example, the base station capability may be provided in the configuration information.

At 430, the UE 415 may determine whether the UE 415 is configured to support a modulation scheme in at least one band associated with a BoBC. A BoBC may include a plurality of different bands (e.g., frequency bands). Each band may have one or more CCs. For example, a first band may have a first set of CCs and a second band may have a second set of CCs. The UE 415 may be scheduled by the base station 405 with downlink on both the first and the second band. As such, the UE 415 may report its UE capability, to the base station 405, for each band associated with the BoBC, either separately or combined.

In some examples, the UE 415 may receive the configuration information, and determine whether it is configured to support the modulation scheme based on the configuration information. In an example, the UE 415 may identify that it supports 1024QAM based on UE capability. The UE 415 may also determine that it is configured with 1024QAM for at least one BoBC based on the configuration information.

At 435, the UE 415 may identify a plurality of TBS values. In some cases, the plurality of TBS values may be based on determining whether the UE 415 is configured with the modulation scheme in at least one BoBC. For example, if the UE 415 supports and is configured with the modulation scheme in the at least one BoBC, TBS values associated with the modulation scheme may be part of a lookup table for mapping both a TBS value based on $I_{TBS}$ and $N_{PRB}$ and mapping a scaled version of the TBS value.

In some examples, the UE 415 may indicate that the first band supports 1024QAM, but the second band does not support 1024QAM. As such, the first set of CCs of the first band may be scheduled in the downlink with 1024QAM. For the first band, when the UE 415 maps to a TBS value in a lookup table using $I_{TBS}$ and an allocation of $N_{RB}S$, and maps a following scaled version of the TB S value, the UE 415 may include TB S values corresponding to the 1024QAM in the lookup table. In the case for the second band, however, when the UE 415 maps to a TBS value in a lookup table using $I_{TBS}$ and an allocation of $N_{RB}S$, the UE 415 may disregard TBS values corresponding to the 1024QAM in the lookup table.

In another example, the UE 415 may identify that the UE 415 does not support a modulation scheme in at least one band associated with a BoBC. For example, the UE 415 may identify that it does not support 1024QAM for least one band associated with a BoBC, but supports the 1024QAM in a second BoBC. For the second BoBC, when the UE 415 maps to a TBS value in a lookup table using $I_{TBS}$ and an allocation of $N_{RBS}$, the UE 415 may disregard TBS values corresponding to the 1024QAM in the lookup table.

At 440, the UE 415 may identify a scaled TBS value. At 445, the UE 415 may map the scaled TBS value to a TBS value of the plurality of TBS values. In one example, when the UE 415 supports 1024QAM, the UE 415 may include TBS values corresponding to the 1024QAM when mapping a scaled version of the TBS value. Alternatively, when the UE 415 does no support 1024QAM for least one band associated with a BoBC, the UE 415 may be capable of deciding whether to include or disregard the TBS values corresponding to the 1024QAM in the lookup table, when mapping the scaled TBS value. For example, the UE 415 may support 1024QAM for a first band of the BoBC, but may not support 1024QAM for a second band of the BoBC, or a second BoBC. In this example, the UE 415 may determine whether to include TB S values corresponding to the 1024QAM when mapping a scaled version of the TBS value for the second band or the second BoBC, because the UE 415 may already be aware of TBS values for 1024QAM since it used them for the first band. As such, the UE 415 may use TBS values for 1024QAM when mapping a scaled TBS value in a lookup table for bands that do not support the 1024QAM.

Alternatively, the UE 415 may not support 1024QAM for a first BoBC, but may support 1024QAM for a second BoBC. Similarly, the UE 415 may determine whether to include TBS values corresponding to the 1024QAM when mapping a scaled version of the TBS value for the first BoBC, because the UE 415 may be aware of TBS values corresponding to 1024QAM because it supports these values for the second BoBC.

At 450, the UE 415 may communicate, with the base station 405, data on a transport block having a size corresponding to the mapped TBS value.

Figure 5:
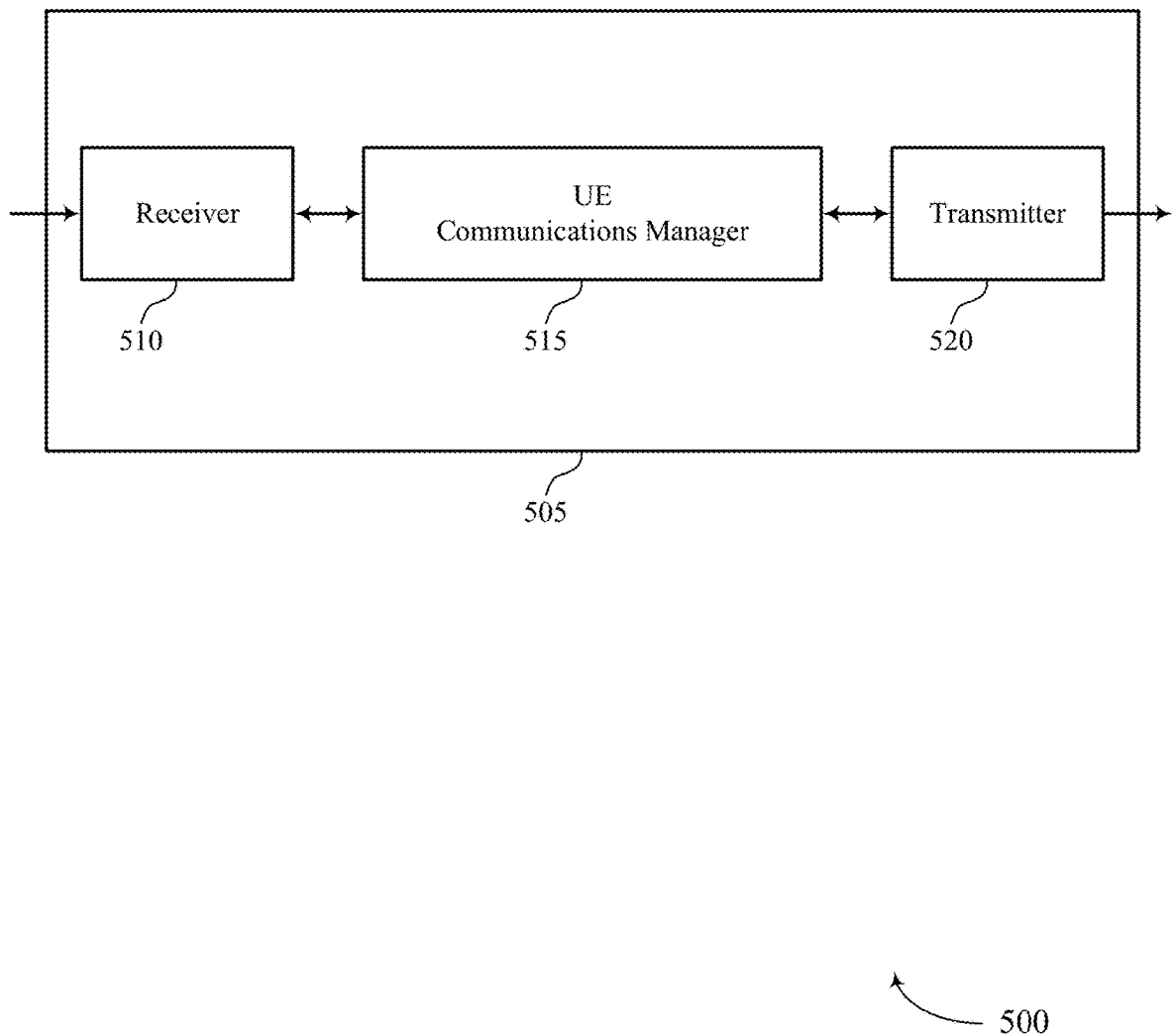
FIGS. 5 and 6 show block diagrams of devices that support TBS determination for a TTI in accordance with aspects of the present disclosure.

FIG. 5 shows a block diagram 500 of a device 505 that supports TBS determination for a TTI in accordance with aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to TBS determination for a TTI, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may determine whether the UE is configured to support a modulation scheme, identify a set of TBS values based on whether the UE is configured with the modulation scheme, identify a scaled TBS value that is based on a length of a TTI, map the scaled TBS value to a TBS value of the set of TBS values, and communicate, with a base station during the TTI, data on a transport block having a size corresponding to the mapped TBS value. The UE communications manager 515 may be an example of aspects of the UE communications manager 810 described herein.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
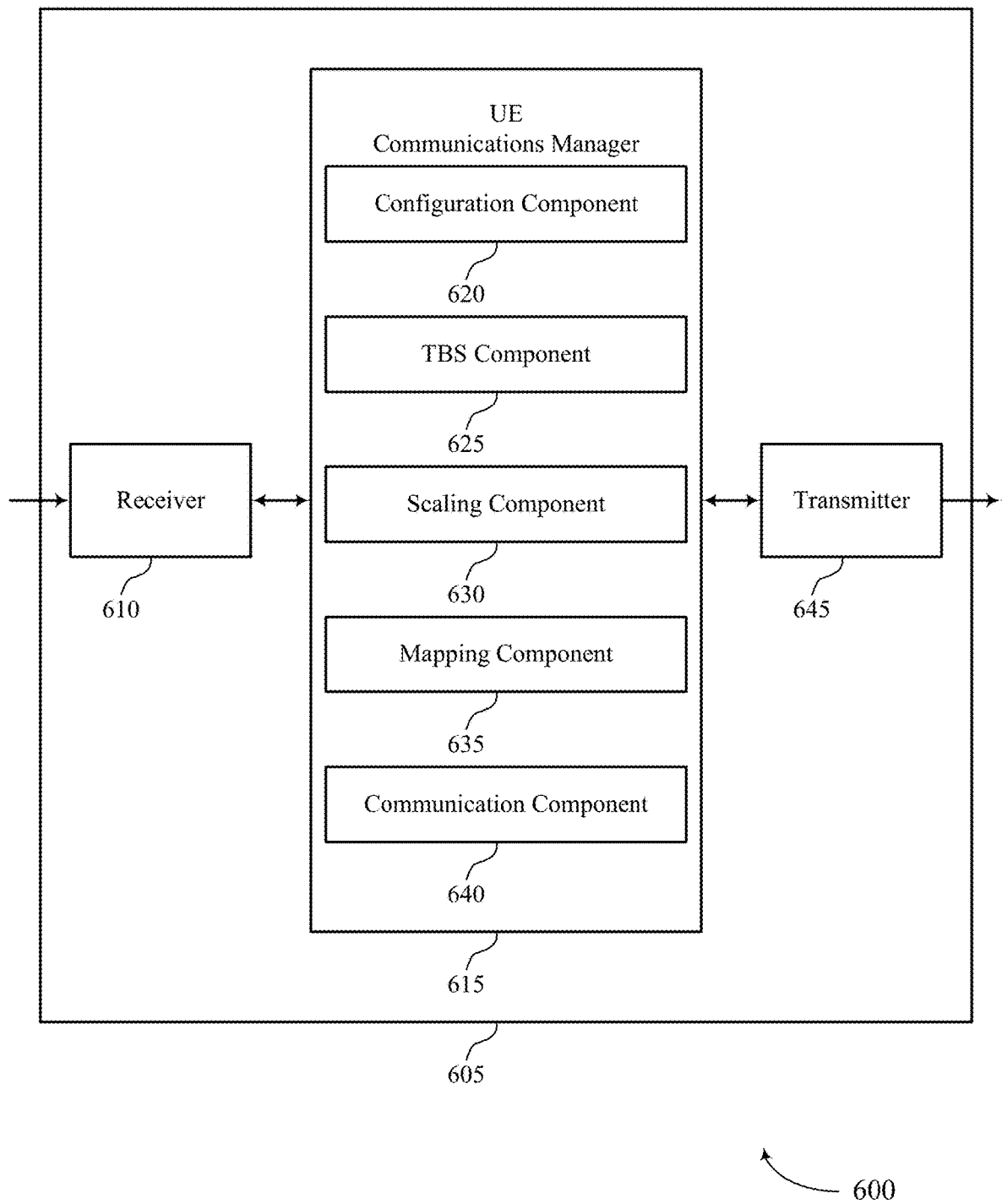

FIG. 6 shows a block diagram 600 of a device 605 that supports TBS determination for a TTI in accordance with aspects of the present disclosure. The device 605 may be an example of aspects of a device 505 or a UE 115 as described herein. The device 605 may include a receiver 610, a UE communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to TBS determination for a TTI, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a configuration component 620, a TBS component 625, a scaling component 630, a mapping component 635, and a communication component 640. The communications manager 615 may be an example of aspects of the UE communications manager 810 described herein.

The configuration component 620 may determine whether the UE is configured to support a modulation scheme. The TBS component 625 may identify a set of TBS values based on whether the UE is configured with the modulation scheme. The scaling component 630 may identify a scaled TBS value that is based on a length of a TTI. The mapping component 635 may map the scaled TBS value to a TBS value of the set of TBS values. The communication component 640 may communicate, with a base station during the TTI, data on a transport block having a size corresponding to the mapped TBS value.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
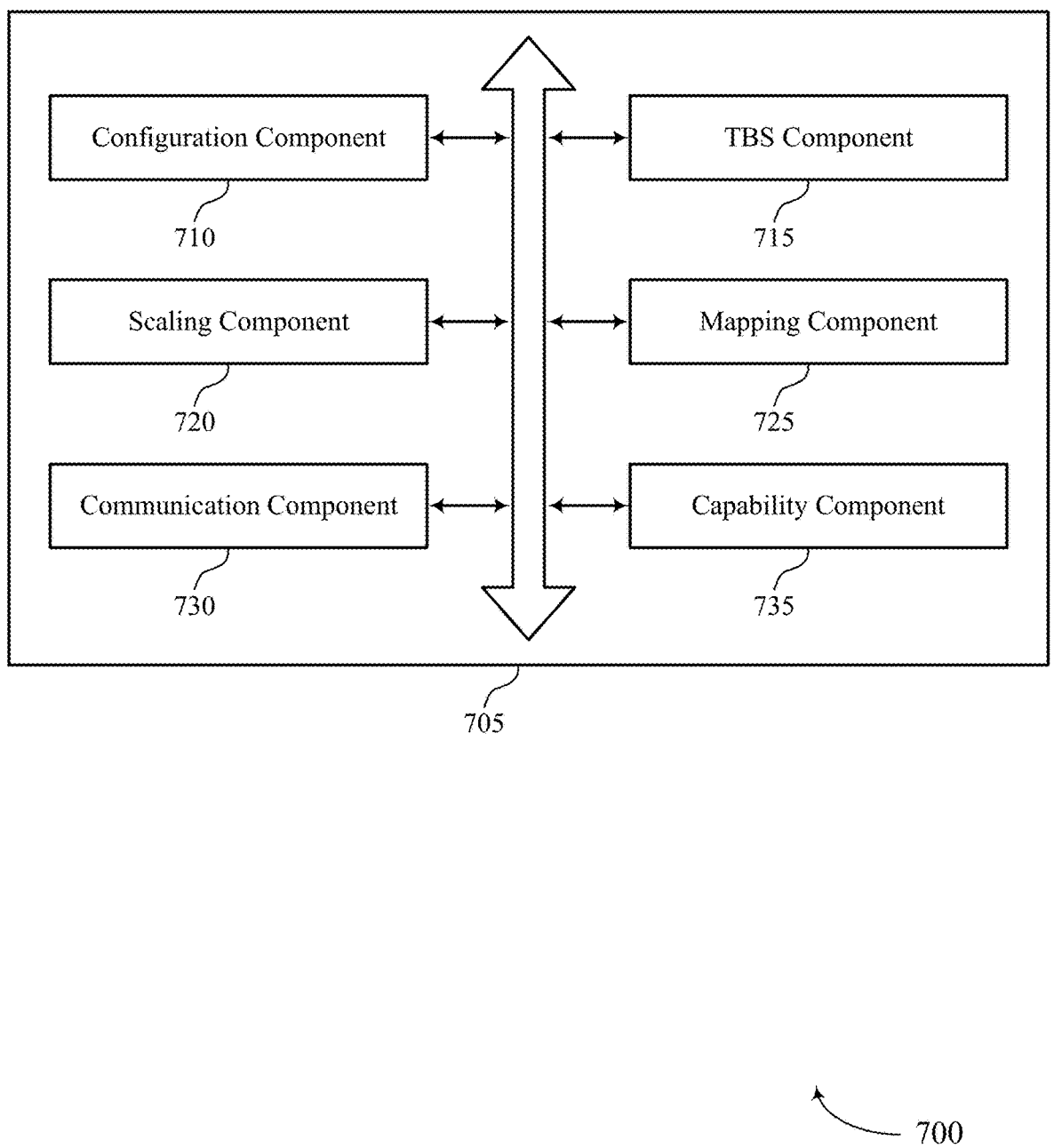
FIG. 7 shows a block diagram of a device that supports TBS determination for a TTI in accordance with aspects of the present disclosure.

FIG. 7 shows a block diagram 700 of a UE communications manager 705 that supports TBS determination for a TTI in accordance with aspects of the present disclosure. The UE communications manager 705 may be an example of aspects of a UE communications manager 515, a UE communications manager 615, or a UE communications manager 810 described herein. The UE communications manager 705 may include a configuration component 710, a TBS component 715, a scaling component 720, a mapping component 725, a communication component 730, and a capability component 735. Each of these modules may communicate, directly or indirectly, with one another (e.g., via one or more buses).

The configuration component 710 may determine whether the UE is configured to support a modulation scheme. In some examples, the configuration component 710 may determine that the UE is not configured with the modulation scheme based on received configuration information. In some examples, the configuration component 710 may determine that the UE is configured with the modulation scheme based on received configuration information. In some examples, the configuration component 710 may determine whether the UE is configured with the modulation scheme in at least one band associated with the BoBC. In some examples, the configuration component 710 may determine that the UE is not configured with the modulation scheme in the at least one band or another band associated with the BoBC. The configuration component 710 may determine that the UE is configured with the modulation scheme in at least one band associated with the BoBC, an determine that the UE is not configured with the modulation scheme in at least another band associated with the BoBC or for another BoBC, or both. The configuration component 710 may determine that the UE is not configured with the modulation scheme for the BoBC, and determine that the UE is configured with the modulation scheme for a second BoBC.

The TBS component 715 may identify a set of TBS values based on whether the UE is configured with the modulation scheme. In some examples, the TBS component 715 may identify a TBS index based on an MCS index. The TBS component 715 may identify a TBS value in a TBS lookup table based on the TBS index and an allocation of RBs for the TTI. In some examples, the TBS component 715 may disregard TBS values associated with the modulation scheme in a TBS lookup table based on determining that the base station does not support the modulation scheme. In some examples, the TBS component 715 may disregard one or more TBS values associated with the modulation scheme based on determining that the UE is not configured with the modulation scheme.

In some examples, the TBS component 715 may identify the set of TBS values is based on determining that the UE is configured with the modulation scheme. In some examples, TBS component 715 may identify a TBS value in a TBS lookup table based on the UE not being configured with the modulation scheme in the at least one band or another band associated with the BoBC, where identifying the TBS values further includes disregarding TBS values corresponding to the modulation scheme associated with the BoBC. The TBS component 715 may identify a TBS value in a TBS lookup table, for the at least another band associated with the BoBC or for another BoBC, or both based on the UE not being configured with the modulation scheme in the at least another band associated with the BoBC or for another BoBC, where identifying the TBS values further includes disregarding TBS values corresponding to the modulation scheme associated with the at least one band associated with the BoBC.

The TBS component 715 may identify, for the BoBC, a TBS value in a TBS lookup table based at least in part on determining that the UE is not configured with the modulation scheme for the BoBC and determining that the UE is configured with the modulation scheme for a second BoBC, where identifying the TBS values, for the BoBC, further includes including TBS values corresponding to the modulation scheme supported by the second BoBC.

The scaling component 720 may identify a scaled TBS value that is based on a length of a TTI. In some examples, the scaling component 720 may scale the TBS value by a factor based on the length of the TTI, where the scaled TBS value is based on the scaling. In some examples, the scaling component 720 may scale the TBS value by a factor, where mapping the scaled TBS value to the TBS value of the set of TBS values is based on the modulation scheme for the BoBC. In some examples, the scaling component 720 may scale the TBS value associated with the band. The scaling component 720 may scale the TBS value associated with the at least another band associated with the BoBC or for another BoBC, or both. The scaling component 720 may scale the TBS value associated with the BoBC.

The mapping component 725 may map the scaled TBS value to a TBS value of the set of TBS values. In some examples, the mapping component 725 may map the scaled TBS value to the TBS value of the set of TBS values in the TBS lookup table. In some examples, the mapping component 725 may map the scaled TBS value associated with the band to a TBS value of the set of TBS values in the TBS lookup table, the TBS lookup table including TBS values corresponding to the modulation scheme associated with the BoBC.

The mapping component 725 may map the scaled TBS value, associated with the at least another band associated with the BoBC or for another BoBC, or both, to a TBS value of the plurality of TBS values in the TBS lookup table, the TBS lookup table including TBS values corresponding to the modulation scheme associated with the at least one band associated with the BoBC. The mapping component 725 may map the scaled TBS value, associated with the at least another band associated with the BoBC or for another BoBC, or both, to a TBS value of the plurality of TBS values in the TBS lookup table, the TBS lookup table disregarding TBS values corresponding to the modulation scheme associated with the at least one band associated with the BoBC. The mapping component 725 may map the scaled TBS value, associated with the BoBC, to a TBS value of the plurality of TBS values in the TBS lookup table, the TBS lookup table including or excluding TBS values corresponding to the modulation scheme associated with the second BoBC.

The communication component 730 may communicate, with a base station during the TTI, data on a transport block having a size corresponding to the mapped TBS value. The capability component 735 may identify a UE capability to support the modulation scheme, where determining whether the UE is configured to support the modulation scheme is based on the UE capability. In some examples, the capability component 735 may receive, from the base station, a signal indicating a base station capability to support the modulation scheme. In some examples, the capability component 735 may determine whether the base station supports the modulation scheme based on the signal.

Figure 8:
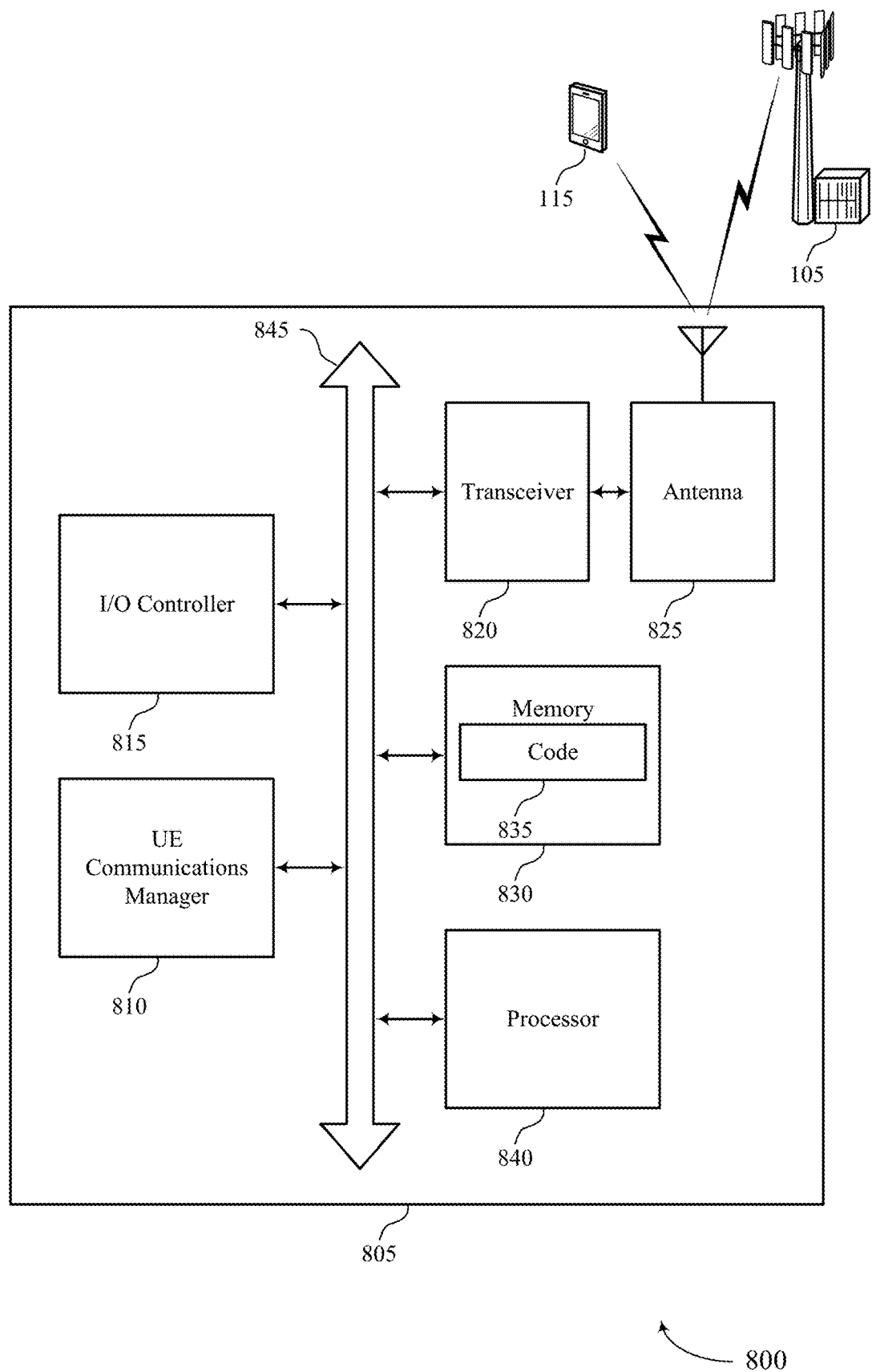
FIG. 8 shows a diagram of a system including a device that supports TBS determination for a TTI in accordance with aspects of the present disclosure.

FIG. 8 shows a diagram of a system 800 including a device 805 that supports TBS determination for a TTI in accordance with aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may determine whether the UE is configured to support a modulation scheme, identify a set of TBS values based on whether the UE is configured with the modulation scheme, identify a scaled TBS value that is based on a length of a TTI, map the scaled TBS value to a TBS value of the set of TBS values, and communicate, with a base station during the TTI, data on a transport block having a size corresponding to the mapped TBS value.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting TBS determination for a TTI).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
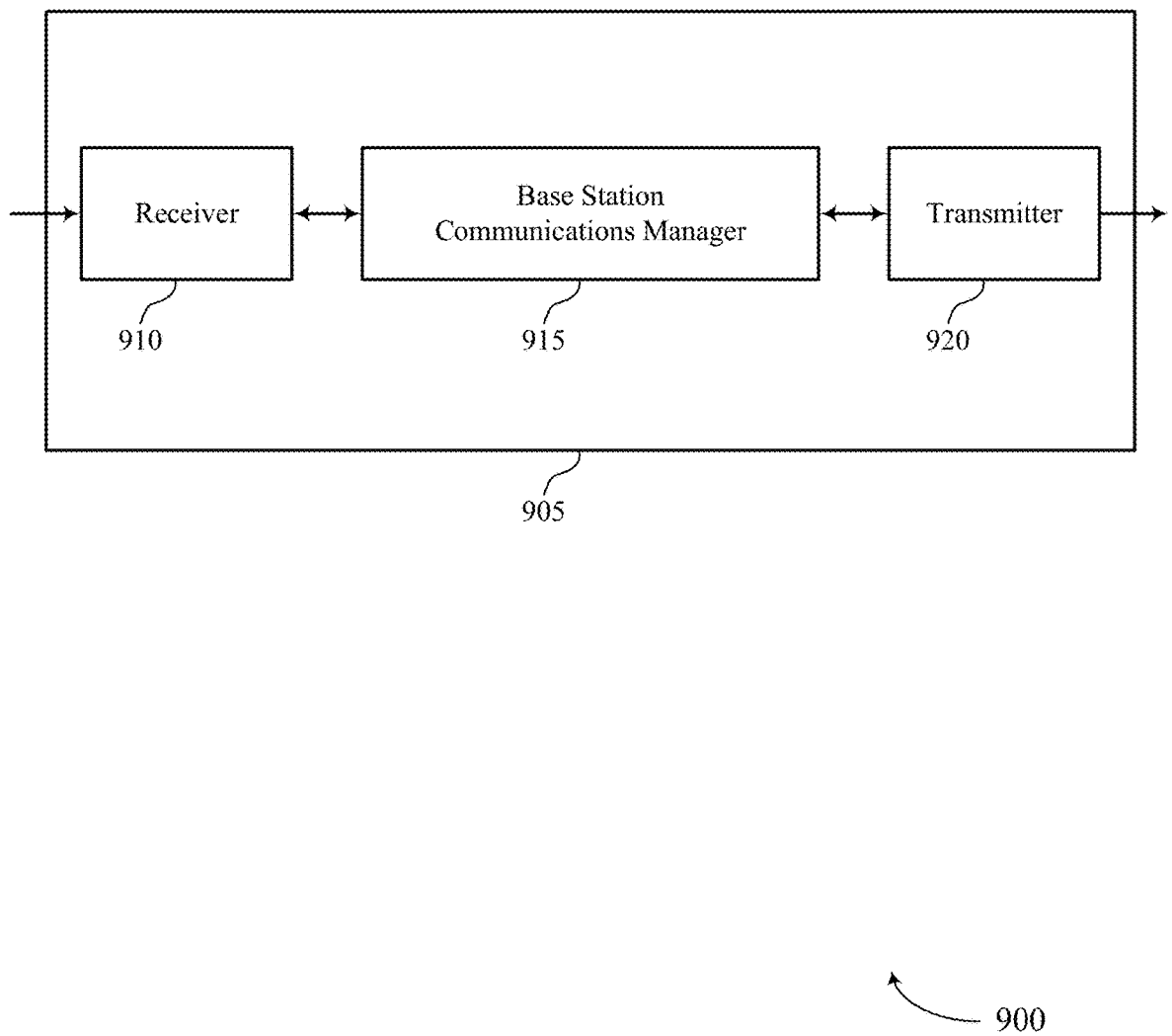
FIGS. 9 and 10 show block diagrams of devices that support TBS determination for a TTI in accordance with aspects of the present disclosure.

FIG. 9 shows a block diagram 900 of a device 905 that supports TBS determination for a TTI in accordance with aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to TBS determination for a TTI, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may identify a UE capability to support a modulation scheme, identify a set of TBS values based on the modulation scheme, map a scaled TBS value that is based on a length of a TTI for communicating with the UE to a TBS value of the set of TBS values, and communicate, with the UE during the TTI, data on a transport block having a size corresponding to the mapped TBS value. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
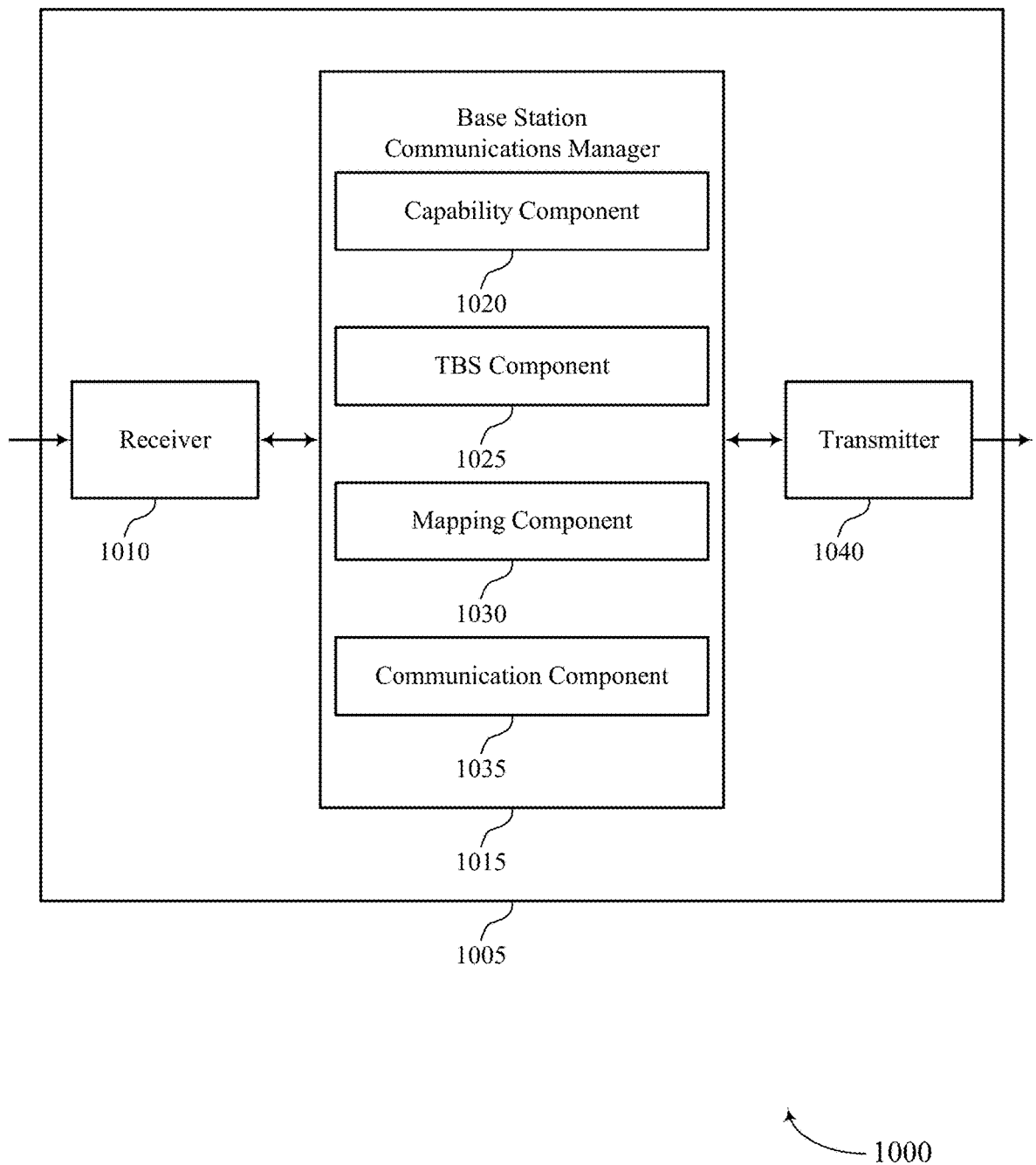

FIG. 10 shows a block diagram 1000 of a device 1005 that supports TBS determination for a TTI in accordance with aspects of the present disclosure. The device 1005 may be an example of aspects of a device 905 or a base station 115 as described herein. The device 1005 may include a receiver 1010, a base station communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to TBS determination for a TTI, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a capability component 1020, a TBS component 1025, a mapping component 1030, and a communication component 1035. The base station communications manager 1015 may be an example of aspects of the base station communications manager 1210 described herein.

The capability component 1020 may identify a UE capability to support a modulation scheme. The TBS component 1025 may identify a set of TBS values based on the modulation scheme. The mapping component 1030 may map a scaled TBS value that is based on a length of a TTI for communicating with the UE to a TBS value of the set of TBS values. The communication component 1035 may communicate, with the UE during the TTI, data on a transport block having a size corresponding to the mapped TBS value.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
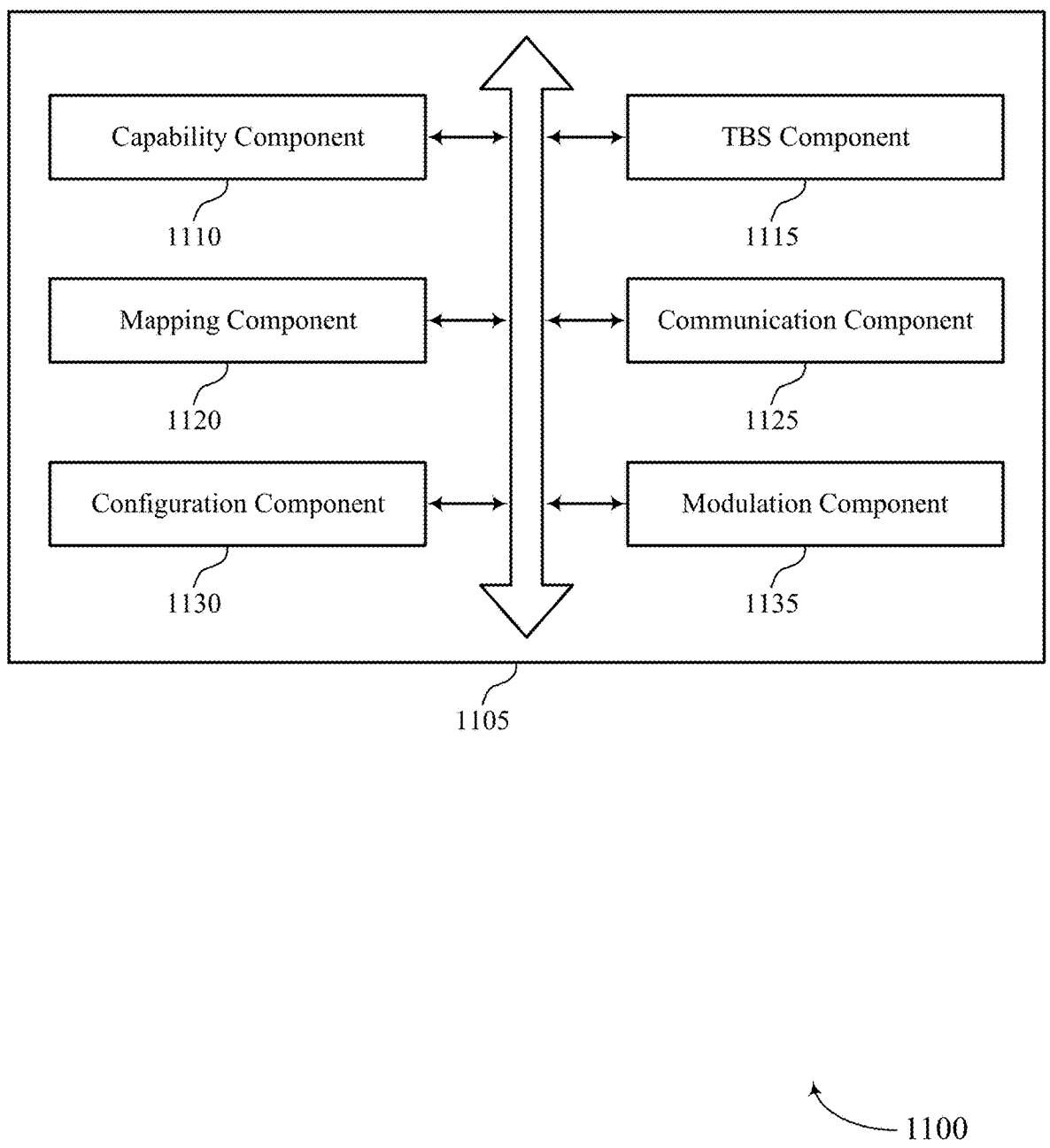
FIG. 11 shows a block diagram of a device that supports TBS determination for a TTI in accordance with aspects of the present disclosure.

FIG. 11 shows a block diagram 1100 of a base station communications manager 1105 that supports TBS determination for a TTI in accordance with aspects of the present disclosure. The base station communications manager 1105 may be an example of aspects of a base station communications manager 915, a base station communications manager 1015, or a base station communications manager 1210 described herein. The base station communications manager 1105 may include a capability component 1110, a TBS component 1115, a mapping component 1120, a communication component 1125, a configuration component 1130, and a modulation component 1135. Each of these modules may communicate, directly or indirectly, with one another (e.g., via one or more buses).

The capability component 1110 may identify a UE capability to support a modulation scheme. In some examples, the capability component 1110 may transmit, to a UE, a signal indicating a base station capability to support the modulation scheme. In some examples, the capability component 1110 may identify the modulation scheme based on a base station capability.

The TBS component 1115 may identify a set of TBS values based on the modulation scheme. The mapping component 1120 may map a scaled TBS value that is based on a length of a TTI for communicating with the UE to a TBS value of the set of TBS values. The communication component 1125 may communicate, with the UE during the TTI, data on a transport block having a size corresponding to the mapped TBS value. The configuration component 1130 may configure the UE with the modulation scheme based on transmitting, to the UE, configuration information for the modulation scheme, where communicating data on the transport block having the size corresponding to the mapped TBS value is based on configuring the UE with the modulation scheme.

The modulation component 1135 may determine an MCS index and an allocation of RBs for the UE based on the modulation scheme. In some examples, the modulation component 1135 may transmit the MCS index and the allocation of RBs to the UE using the transport block, where communicating data on the transport block having the size corresponding to the mapped TBS value is based on transmitting the MCS index and the allocation of RBs to the UE using the transport block.

Figure 12:
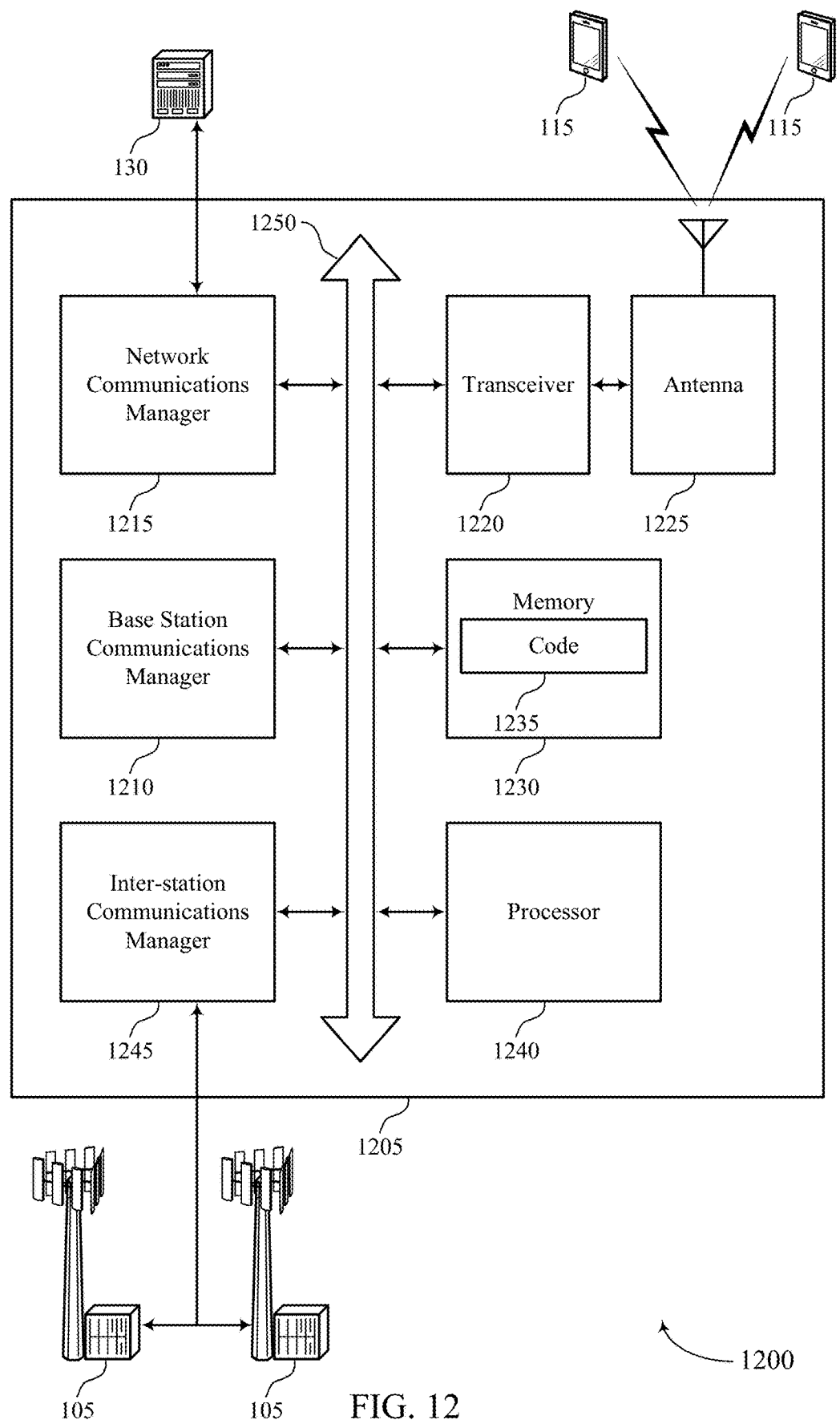
FIG. 12 shows a diagram of a system including a device that supports TBS determination for a TTI in accordance with aspects of the present disclosure.

FIG. 12 shows a diagram of a system 1200 including a device 1205 that supports TBS determination for a TTI in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may identify a UE capability to support a modulation scheme, identify a set of TBS values based on the modulation scheme, map a scaled TBS value that is based on a length of a TTI for communicating with the UE to a TBS value of the set of TBS values, and communicate, with the UE during the TTI, data on a transport block having a size corresponding to the mapped TBS value.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting TBS determination for a TTI).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
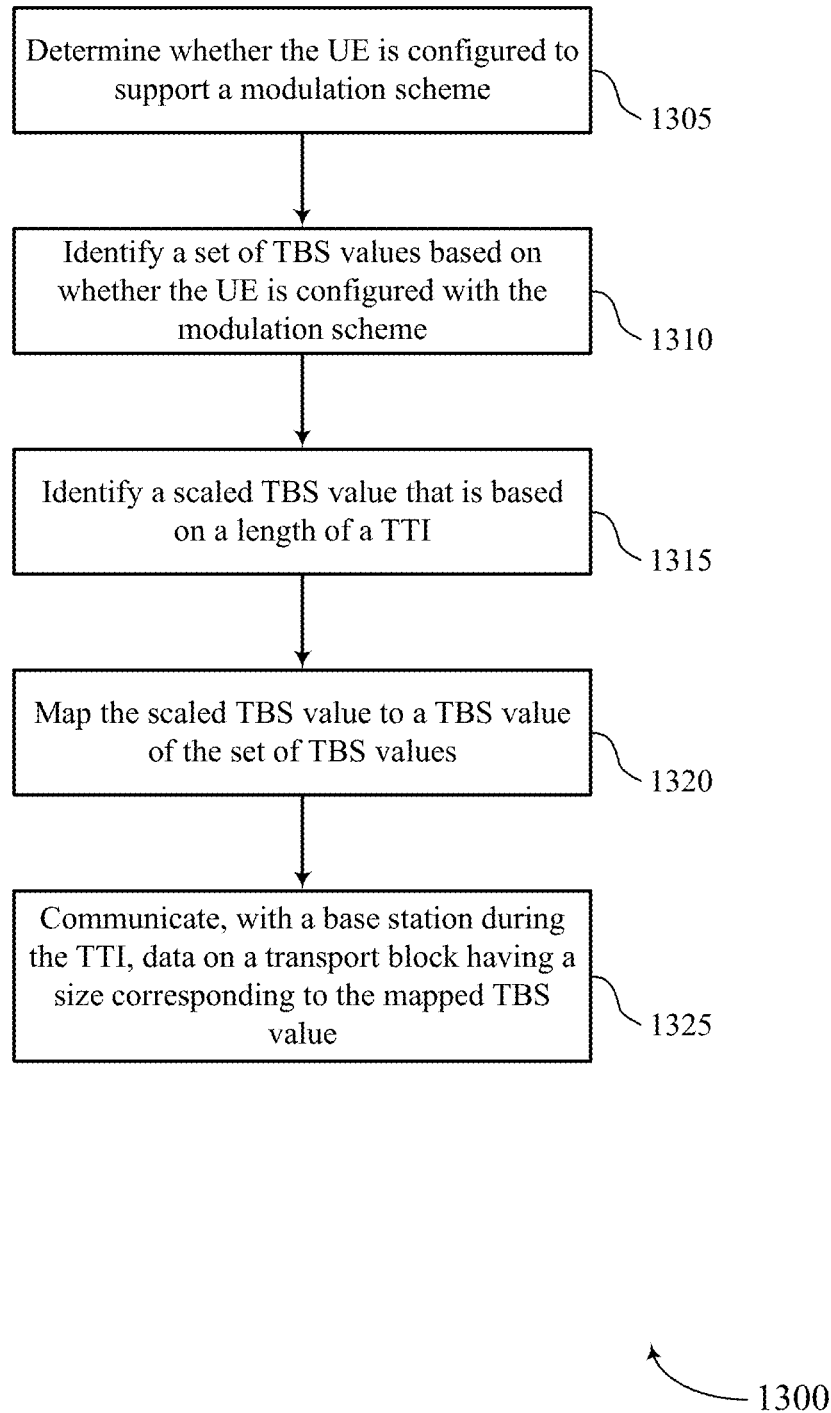
FIGS. 13 through 16 show flowcharts illustrating methods that support TBS determination for a TTI in accordance with aspects of the present disclosure.

FIG. 13 shows a flowchart illustrating a method 1300 that supports TBS determination for a TTI in accordance with aspects of the present disclosure. The operations of method 1300 may be implemented by a UE 115 or its components as described herein. For example, the operations of method 1300 may be performed by a communications manager as described with reference to FIGS. 5 to 8. In some examples, a UE may execute a set of instructions to control the functional elements of the UE to perform the functions described below. Additionally, or alternatively, a UE may perform aspects of the functions described below using special-purpose hardware.

At 1305, the UE may determine whether the UE is configured to support a modulation scheme. The operations of 1305 may be performed according to the methods described herein. In some examples, aspects of the operations of 1305 may be performed by a configuration component as described with reference to FIGS. 5 to 8.

At 1310, the UE may identify a set of TBS values based on whether the UE is configured with the modulation scheme. The operations of 1310 may be performed according to the methods described herein. In some examples, aspects of the operations of 1310 may be performed by a TBS component as described with reference to FIGS. 5 to 8.

At 1315, the UE may identify a scaled TBS value that is based on a length of a TTI. The operations of 1315 may be performed according to the methods described herein. In some examples, aspects of the operations of 1315 may be performed by a scaling component as described with reference to FIGS. 5 to 8.

At 1320, the UE may map the scaled TBS value to a TBS value of the set of TBS values. The operations of 1320 may be performed according to the methods described herein. In some examples, aspects of the operations of 1320 may be performed by a mapping component as described with reference to FIGS. 5 to 8.

At 1325, the UE may communicate, with a base station during the TTI, data on a transport block having a size corresponding to the mapped TBS value. The operations of 1325 may be performed according to the methods described herein. In some examples, aspects of the operations of 1325 may be performed by a communication component as described with reference to FIGS. 5 to 8.

Figure 14:
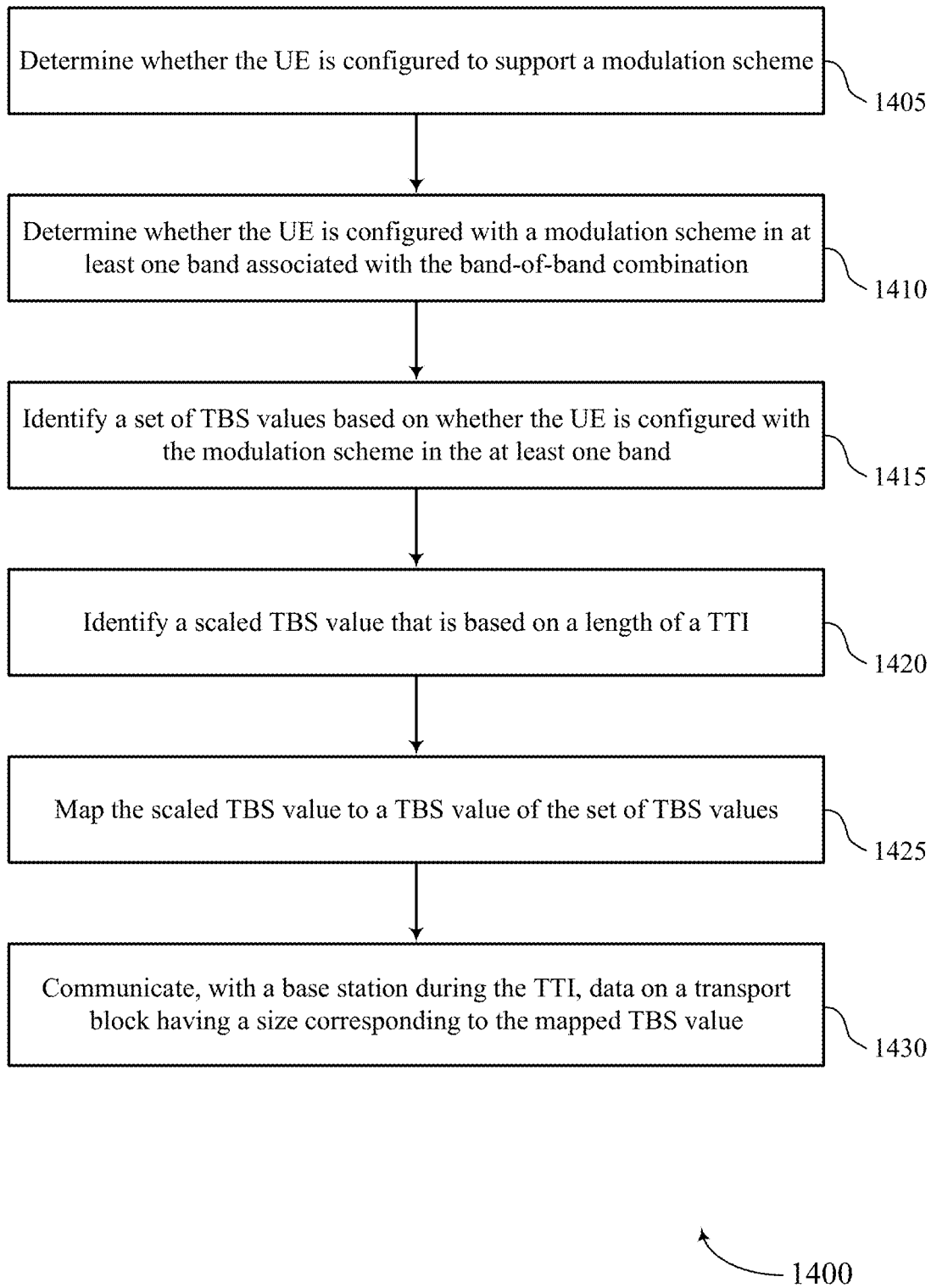

FIG. 14 shows a flowchart illustrating a method 1400 that supports TBS determination for a TTI in accordance with aspects of the present disclosure. The operations of method 1400 may be implemented by a UE 115 or its components as described herein. For example, the operations of method 1400 may be performed by a communications manager as described with reference to FIGS. 5 to 8. In some examples, a UE may execute a set of instructions to control the functional elements of the UE to perform the functions described below. Additionally, or alternatively, a UE may perform aspects of the functions described below using special-purpose hardware.

At 1405, the UE may determine whether the UE is configured to support a modulation scheme. The operations of 1405 may be performed according to the methods described herein. In some examples, aspects of the operations of 1405 may be performed by a configuration component as described with reference to FIGS. 5 to 8.

At 1410, the UE may determine whether the UE is configured with the modulation scheme in at least one band associated with the BoBC. The operations of 1410 may be performed according to the methods described herein. In some examples, aspects of the operations of 1410 may be performed by a configuration component as described with reference to FIGS. 5 to 8.

At 1415, the UE may identify a set of TBS values based on whether the UE is configured with the modulation scheme in the at least one band. The operations of 1415 may be performed according to the methods described herein. In some examples, aspects of the operations of 1415 may be performed by a TBS component as described with reference to FIGS. 5 to 8.

At 1420, the UE may identify a scaled TBS value that is based on a length of a TTI. The operations of 1420 may be performed according to the methods described herein. In some examples, aspects of the operations of 1420 may be performed by a scaling component as described with reference to FIGS. 5 to 8.

At 1425, the UE may map the scaled TBS value to a TBS value of the set of TBS values. The operations of 1425 may be performed according to the methods described herein. In some examples, aspects of the operations of 1425 may be performed by a mapping component as described with reference to FIGS. 5 to 8.

At 1430, the UE may communicate, with a base station during the TTI, data on a transport block having a size corresponding to the mapped TBS value. The operations of 1430 may be performed according to the methods described herein. In some examples, aspects of the operations of 1430 may be performed by a communication component as described with reference to FIGS. 5 to 8.

Figure 15:
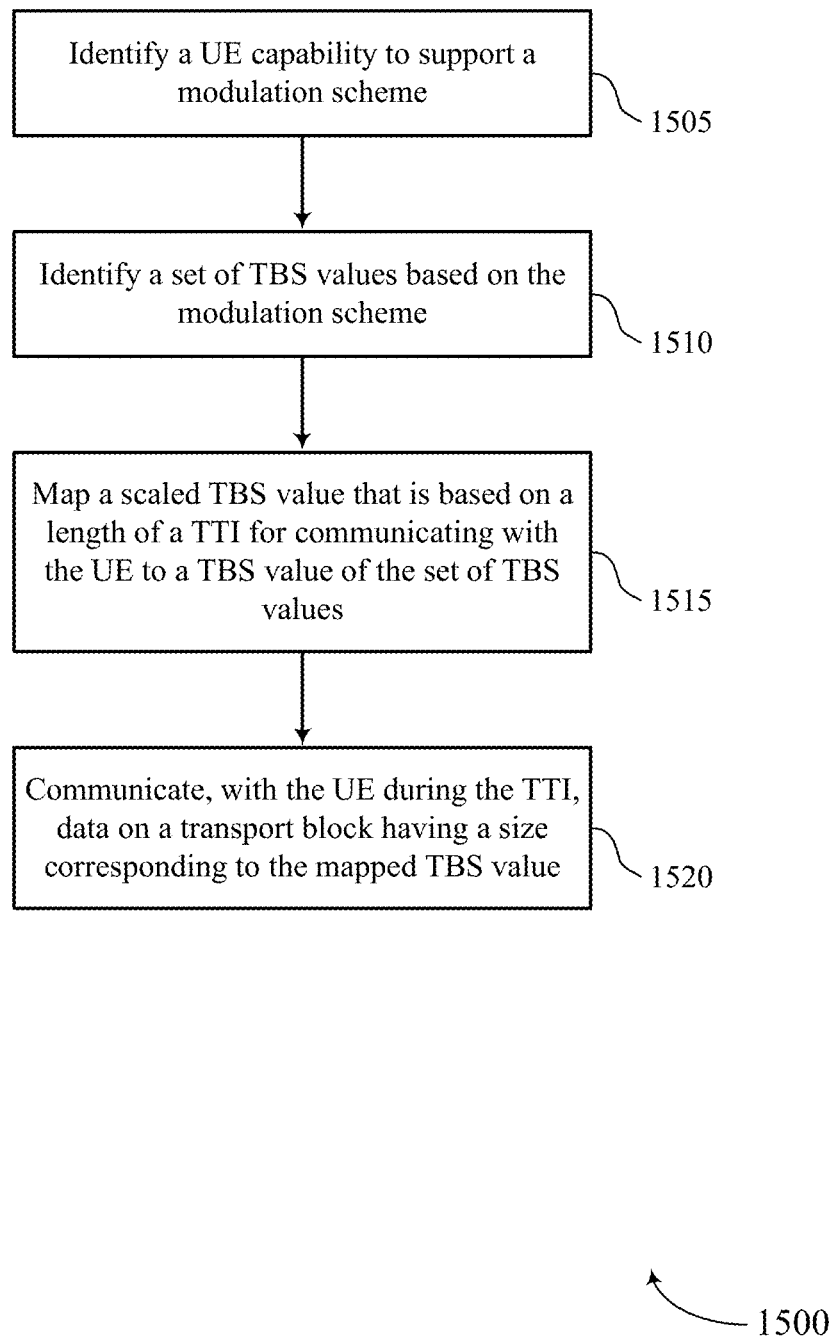

FIG. 15 shows a flowchart illustrating a method 1500 that supports TBS determination for a TTI in accordance with aspects of the present disclosure. The operations of method 1500 may be implemented by a base station 105 or its components as described herein. For example, the operations of method 1500 may be performed by a communications manager as described with reference to FIGS. 9 to 12. In some examples, a base station may execute a set of instructions to control the functional elements of the base station to perform the functions described below. Additionally, or alternatively, a base station may perform aspects of the functions described below using special-purpose hardware.

At 1505, the base station may identify a UE capability to support a modulation scheme. The operations of 1505 may be performed according to the methods described herein. In some examples, aspects of the operations of 1505 may be performed by a capability component as described with reference to FIGS. 9 to 12.

At 1510, the base station may identify a set of TBS values based on the modulation scheme. The operations of 1510 may be performed according to the methods described herein. In some examples, aspects of the operations of 1510 may be performed by a TBS component as described with reference to FIGS. 9 to 12.

At 1515, the base station may map a scaled TBS value that is based on a length of a TTI for communicating with the UE to a TBS value of the set of TBS values. The operations of 1515 may be performed according to the methods described herein. In some examples, aspects of the operations of 1515 may be performed by a mapping component as described with reference to FIGS. 9 to 12.

At 1520, the base station may communicate, with the UE during the TTI, data on a transport block having a size corresponding to the mapped TBS value. The operations of 1520 may be performed according to the methods described herein. In some examples, aspects of the operations of 1520 may be performed by a communication component as described with reference to FIGS. 9 to 12.

Figure 16:
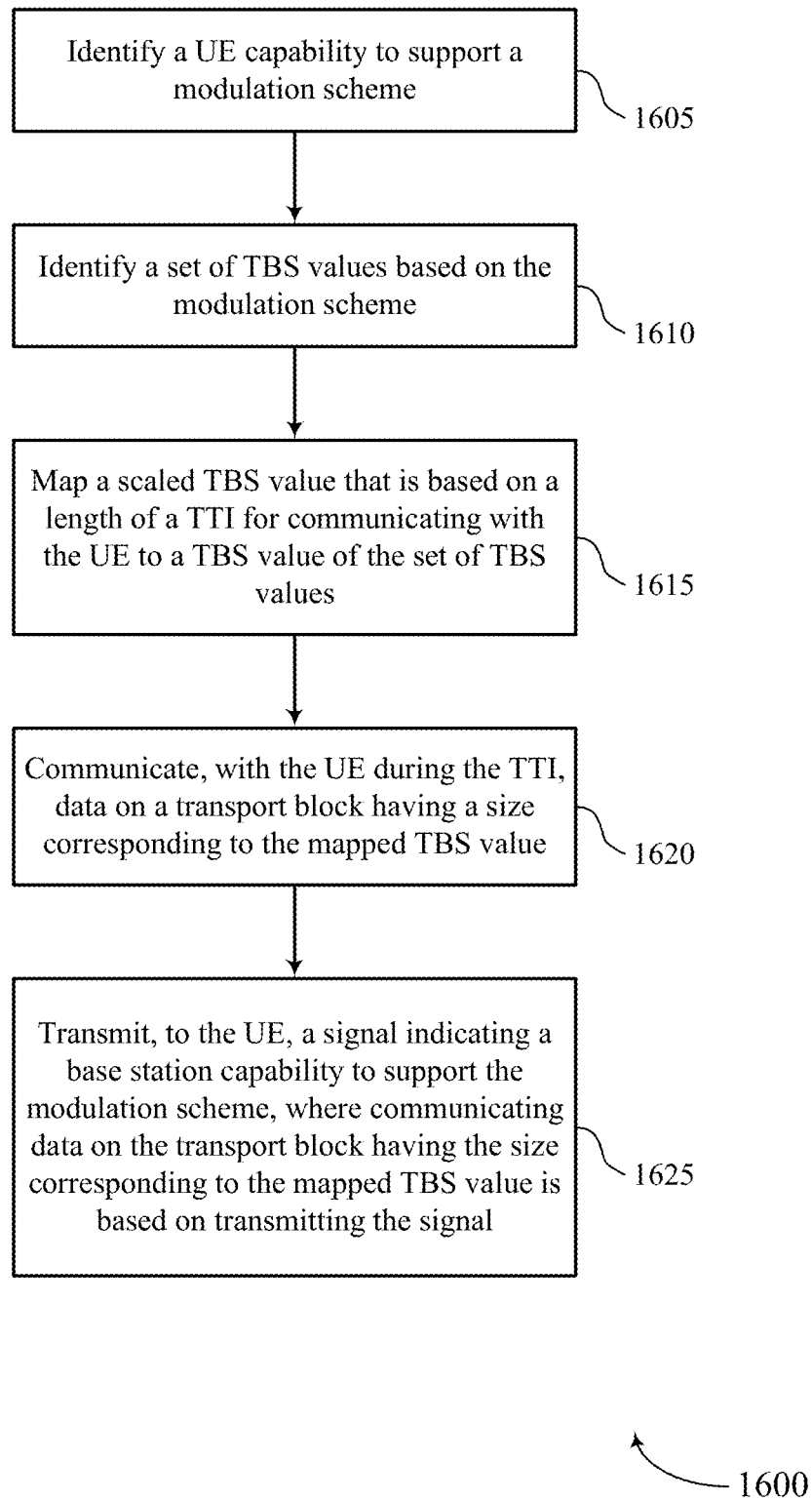

FIG. 16 shows a flowchart illustrating a method 1600 that supports TBS determination for a TTI in accordance with aspects of the present disclosure. The operations of method 1600 may be implemented by a base station 105 or its components as described herein. For example, the operations of method 1600 may be performed by a communications manager as described with reference to FIGS. 9 to 12. In some examples, a base station may execute a set of instructions to control the functional elements of the base station to perform the functions described below. Additionally, or alternatively, a base station may perform aspects of the functions described below using special-purpose hardware.

At 1605, the base station may identify a UE capability to support a modulation scheme. The operations of 1605 may be performed according to the methods described herein. In some examples, aspects of the operations of 1605 may be performed by a capability component as described with reference to FIGS. 9 to 12.

At 1610, the base station may identify a set of TBS values based on the modulation scheme. The operations of 1610 may be performed according to the methods described herein. In some examples, aspects of the operations of 1610 may be performed by a TBS component as described with reference to FIGS. 9 to 12.

At 1615, the base station may map a scaled TBS value that is based on a length of a TTI for communicating with the UE to a TBS value of the set of TBS values. The operations of 1615 may be performed according to the methods described herein. In some examples, aspects of the operations of 1615 may be performed by a mapping component as described with reference to FIGS. 9 to 12.

At 1620, the base station may communicate, with the UE during the TTI, data on a transport block having a size corresponding to the mapped TBS value. The operations of 1620 may be performed according to the methods described herein. In some examples, aspects of the operations of 1620 may be performed by a communication component as described with reference to FIGS. 9 to 12.

At 1625, the base station may transmit, to the UE, a signal indicating a base station capability to support the modulation scheme, where communicating data on the transport block having the size corresponding to the mapped TBS value is based on transmitting the signal. The operations of 1625 may be performed according to the methods described herein. In some examples, aspects of the operations of 1625 may be performed by a capability component as described with reference to FIGS. 9 to 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining whether the UE is configured to support a modulation scheme;

identifying a plurality of transport block size values that are valid for data communications based at least in part on a capability to support the modulation scheme and whether the UE is configured with the modulation scheme;
identifying a scaled transport block size value that is based at least in part on a length of a transmission time interval;
mapping the scaled transport block size value to a transport block size value of the plurality of transport block size values that are valid for the data communications based at least in part on the capability to support the modulation scheme and whether the UE is configured with the modulation scheme, wherein the scaled transport block size value is different than the mapped transport block size value, and wherein mapping the scaled transport block size value to the transport block size value of the plurality of transport block size values is based at least in part on a subset of a range of a quantity of physical resource blocks, or a subset of a range of a quantity of spatial layers, or both; and
communicating, with a network device during the transmission time interval, data on a transport block having a size corresponding to the mapped transport block size value.

2. The method of claim 1, further comprising:
identifying a UE capability to support the modulation scheme, wherein determining whether the UE is configured to support the modulation scheme is based at least in part on the UE capability.

3. The method of claim 1, further comprising:
receiving, from the network device, configuration information for the modulation scheme, wherein determining whether the UE is configured with the modulation scheme comprises:
determining that the UE is not configured with the modulation scheme based at least in part on the configuration information, wherein identifying the plurality of transport block size values is based at least in part on determining that the UE is not configured with the modulation scheme.

4. The method of claim 3, further comprising:
identifying a transport block size index based at least in part on a modulation coding scheme index;
identifying a transport block size value in a transport block size lookup table based at least in part on the transport block size index and an allocation of resource blocks for the transmission time interval; and
scaling the transport block size value by a factor based at least in part on the length of the transmission time interval, wherein the scaled transport block size value is based at least in part on the scaling.

5. The method of claim 1, further comprising:
receiving, from the network device, control signaling indicating a network device capability to support the modulation scheme; and
determining whether the network device supports the modulation scheme based at least in part on the control signaling, wherein mapping the scaled transport block size value to the transport block size value of the plurality of transport block size values is based at least in part on whether the network device supports the modulation scheme.

6. The method of claim 5, further comprising:
disregarding transport block size values associated with the modulation scheme in a transport block size lookup table based at least in part on determining that the network device does not support the modulation scheme, wherein mapping the scaled transport block size value to the transport block size value of the plurality of transport block size values is based at least in part on the disregarding.

7. The method of claim 5, wherein mapping the scaled transport block size value to the transport block size value of the plurality of transport block size values is based at least in part on determining that the network device supports the modulation scheme and determining that the UE is not configured with the modulation scheme.

8. The method of claim 7, further comprising:
disregarding one or more transport block size values associated with the modulation scheme based at least in part on determining that the UE is not configured with the modulation scheme, wherein mapping the scaled transport block size value to the transport block size value of the plurality of transport block size values is based at least in part on the disregarding.

9. The method of claim 5, wherein the control signaling indicating the network device capability comprises a radio resource control signaling, a UE-specific signaling, a system information block, or a downlink control information, or a combination thereof.

10. The method of claim 1, further comprising:
receiving, from the network device, configuration information for the modulation scheme, wherein determining whether the UE is configured with the modulation scheme comprises:
determining that the UE is configured with the modulation scheme based at least in part on the configuration information for the modulation scheme, wherein identifying the plurality of transport block size values is based at least in part on determining that the UE is configured with the modulation scheme.

11. The method of claim 10, further comprising:
identifying a transport block size index based at least in part on a modulation coding scheme index;
identifying a transport block size value based at least in part on the transport block size index and an allocation of resource blocks for the transmission time interval; and
scaling the transport block size value by a factor based at least in part on the length of the transmission time interval, wherein the scaled transport block size value is based at least in part on the scaling.

12. The method of claim 1, wherein identifying the plurality of transport block size values comprises:
identifying the plurality of transport block size values in a transport block size lookup table based at least in part on whether the UE is configured with the modulation scheme, wherein mapping the scaled transport block size value to the transport block size value of the plurality of transport block size values comprises:
mapping the scaled transport block size value to the transport block size value of the plurality of transport block size values in the transport block size lookup table.

13. The method of claim 1, wherein determining whether the UE is configured with the modulation scheme comprises:
determining whether the UE is configured with the modulation scheme in at least one band associated with a band-of-band combination, wherein identifying the plurality of transport block size values is based at least in part on whether the UE is configured with the modulation scheme in the at least one band associated with the band-of-band combination.

14. The method of claim 13, further comprising:
identifying a transport block size value based at least in part on a transport block size index and an allocation of resource blocks for the transmission time interval; and
scaling the transport block size value by a factor, wherein mapping the scaled transport block size value to the transport block size value of the plurality of transport block size values is based at least in part on the modulation scheme for the band-of-band combination.

15. The method of claim 13, further comprising:
determining that the UE is not configured with the modulation scheme in the at least one band or another band associated with the band-of-band combination; and
identifying a transport block size value in a transport block size lookup table based at least in part on the UE not being configured with the modulation scheme in the at least one band or another band associated with the band-of-band combination, wherein identifying the transport block size values further comprises disregarding transport block size values corresponding to the modulation scheme associated with the band-of-band combination.

16. The method of claim 15, further comprising:
scaling the transport block size value associated with the band; and
mapping the scaled transport block size value associated with the band to a transport block size value of the plurality of transport block size values in the transport block size lookup table, the transport block size lookup table including transport block size values corresponding to the modulation scheme associated with the band-of-band combination.

17. The method of claim 15, further comprising:
scaling the transport block size value associated with the band; and
mapping the scaled transport block size value associated with the band to a transport block size value of the plurality of transport block size values in the transport block size lookup table for the band, wherein mapping the scaled transport block size value further comprises disregarding transport block size values in the transport block size lookup table that are related to the modulation scheme associated with the band-of-band combination.

18. The method of claim 13, further comprising:
determining that the UE is not configured with the modulation scheme for the band-of-band combination;
determining that the UE is configured with the modulation scheme for a second band-of-band combination; and
identifying, for the band-of-band combination, a transport block size value in a transport block size lookup table based at least in part on determining that the UE is not configured with the modulation scheme for the band-of-band combination and determining that the UE is configured with the modulation scheme for a second band-of-band combination, wherein identifying the transport block size values, for the band-of-band combination, further comprises including transport block size values corresponding to the modulation scheme supported by the second band-of-band combination.

19. The method of claim 18, further comprising:
scaling the transport block size value associated with the band-of-band combination; and
mapping the scaled transport block size value, associated with the band-of-band combination, to a transport block size value of the plurality of transport block size values in the transport block size lookup table, the transport block size lookup table including or excluding transport block size values corresponding to the modulation scheme associated with the second band-of-band combination.

20. The method of claim 13, further comprising:
determining that the UE is configured with the modulation scheme in at least one band associated with the band-of-band combination;
determining that the UE is not configured with the modulation scheme in at least another band associated with the band-of-band combination or for another band-of-band combination, or both; and
identifying a transport block size value in a transport block size lookup table, for the at least another band associated with the band-of-band combination or for another band-of-band combination, or both based at least in part on the UE not being configured with the modulation scheme in the at least another band associated with the band-of-band combination or for another band-of-band combination, wherein identifying the transport block size values further comprises disregarding transport block size values corresponding to the modulation scheme associated with the at least one band associated with the band-of-band combination.

21. The method of claim 20, further comprising:
scaling the transport block size value associated with the at least another band associated with the band-of-band combination or for another band-of-band combination, or both; and
mapping the scaled transport block size value, associated with the at least another band associated with the band-of-band combination or for another band-of-band combination, or both, to a transport block size value of the plurality of transport block size values in the transport block size lookup table, the transport block size lookup table including transport block size values corresponding to the modulation scheme associated with the at least one band associated with the band-of-band combination.

22. The method of claim 20, further comprising:
scaling the transport block size value associated with the at least another band associated with the band-of-band combination or for another band-of-band combination, or both; and
mapping the scaled transport block size value, associated with the at least another band associated with the band-of-band combination or for another band-of-band combination, or both, to a transport block size value of the plurality of transport block size values in the transport block size lookup table, the transport block size lookup table disregarding transport block size values corresponding to the modulation scheme associated with the at least one band associated with the band-of-band combination.

23. The method of claim 1, wherein communicating, with the network device during the transmission time interval, comprises a downlink communication, an uplink communication, or both.

24. The method of claim 1, wherein the transmission time interval comprises a shortened transmission time interval.

25. A method for wireless communications at a network device, comprising:
identifying a user equipment ((UE)) capability to support a modulation scheme;

identifying a plurality of transport block size values that are valid for data communications based at least in part on the capability to support the modulation scheme and the modulation scheme;

mapping a scaled transport block size value that is based at least in part on a length of a transmission time interval for communicating with the UE to a transport block size value of the plurality of transport block size values that are valid for the data communications based at least in part on the capability to support the modulation scheme and whether the UE is configured with the modulation scheme, wherein the scaled transport block size value is different than the mapped transport block size value, and wherein mapping the scaled transport block size value to the transport block size value of the plurality of transport block size values is based at least in part on a subset of a range of a quantity of physical resource blocks, or a subset of a range of a quantity of spatial layers, or both; and communicating, with the UE during the transmission time interval, data on a transport block having a size corresponding to the mapped transport block size value.

26. The method of claim 25, further comprising:
configuring the UE with the modulation scheme based at least in part on transmitting, to the UE, configuration information for the modulation scheme, wherein communicating data on the transport block having the size corresponding to the mapped transport block size value is based at least in part on configuring the UE with the modulation scheme.

27. The method of claim 25, further comprising:
transmitting, to the UE, control signaling indicating a network device capability to support the modulation scheme, wherein communicating data on the transport block having the size corresponding to the mapped transport block size value is based at least in part on transmitting the control signaling.

28. The method of claim 27, wherein the control signaling indicating the network device capability comprises a radio resource control signaling, a UE-specific signaling, a system information block, or a downlink control information, or a combination thereof.

29. The method of claim 25, further comprising:
identifying the modulation scheme based at least in part on a network device capability;
determining a modulation coding scheme index and an allocation of resource blocks for the UE based at least in part on the modulation scheme; and
transmitting the modulation coding scheme index and the allocation of resource blocks to the UE using the transport block, wherein communicating data on the transport block having the size corresponding to the mapped transport block size value is based at least in part on transmitting the modulation coding scheme index and the allocation of resource blocks to the UE using the transport block.

30. The method of claim 25, wherein the transmission time interval comprises a shortened transmission time interval.

31. An apparatus for wireless communication, comprising:
a processor,
memory in electronic communication with the processor; and
instructions stored in the memory and executable by the processor to cause the apparatus to:
determine whether the apparatus is configured to support a modulation scheme;
identify a plurality of transport block size values that are valid for data communications based at least in part on a capability to support the modulation scheme and whether the apparatus is configured with the modulation scheme;
identify a scaled transport block size value that is based at least in part on a length of a transmission time interval;
map the scaled transport block size value to a transport block size value of the plurality of transport block size values that are valid for the data communications based at least in part on the capability to support the modulation scheme and whether the apparatus is configured with the modulation scheme, wherein the scaled transport block size value is different than the mapped transport block size value, and wherein to map the scaled transport block size value to the transport block size value of the plurality of transport block size values is based at least in part on a subset of a range of a quantity of physical resource blocks, or a subset of a range of a quantity of spatial layers, or both; and
communicate, with a network device during the transmission time interval, data on a transport block having a size corresponding to the mapped transport block size value.

32. The apparatus of claim 31, wherein the instructions are further executable by the processor to cause the apparatus to:
identify an apparatus capability to support the modulation scheme, wherein the instructions, to determine whether the apparatus is configured to support the modulation scheme, are executable by the processor cause the apparatus to:
determine whether the apparatus is configured to support the modulation scheme based at least in part on the apparatus capability.

33. The apparatus of claim 31, wherein the instructions are further executable by the processor to cause the apparatus to:
receive, from the network device, configuration information for the modulation scheme, wherein the instructions, to determine whether the apparatus is configured with the modulation scheme, are executable by the processor cause the apparatus to:
determine that the apparatus is not configured with the modulation scheme based at least in part on the configuration information, wherein the instructions, to identify the plurality of transport block size values, are executable by the processor cause the apparatus to:
identify the plurality of transport block size values based at least in part on determining that the apparatus is not configured with the modulation scheme.

34. The apparatus of claim 33, wherein the instructions are further executable by the processor to cause the apparatus to:
identify a transport block size index based at least in part on a modulation coding scheme index;
identify a transport block size value in a transport block size lookup table based at least in part on the transport block size index and an allocation of resource blocks for the transmission time interval; and
scale the transport block size value by a factor based at least in part on the length of the transmission time interval, wherein the scaled transport block size value is based at least in part on the scaling.

35. The apparatus of claim 33, wherein the instructions are further executable by the processor to cause the apparatus to:
receive, from the network device, control signaling indicating a network device capability to support the modulation scheme; and
determine whether the network device supports the modulation scheme based at least in part on the control signaling, wherein the instructions, to map the scaled transport block size value to the transport block size value of the plurality of transport block size values, are executable by the processor cause the apparatus to:
map the scaled transport block size value to the transport block size value of the plurality of transport block size values based at least in part on whether the network device supports the modulation scheme.

36. The apparatus of claim 35, wherein the instructions are further executable by the processor to cause the apparatus to:
disregard transport block size values associated with the modulation scheme in a transport block size lookup table based at least in part on determining that the network device does not support the modulation scheme, wherein the instructions, to map the scaled transport block size value to the transport block size value of the plurality of transport block size values, are executable by the processor cause the apparatus to:
map the scaled transport block size value to the transport block size value of the plurality of transport block size values based at least in part on the disregarding.

37. The apparatus of claim 35, wherein to map the scaled transport block size value to the transport block size value of the plurality of transport block size values is based at least in part on that the network device supports the modulation scheme and that the apparatus is not configured with the modulation scheme.

38. The apparatus of claim 37, wherein the instructions are further executable by the processor to cause the apparatus to:
disregard one or more transport block size values associated with the modulation scheme based at least in part on determining that the apparatus is not configured with the modulation scheme, wherein the instructions, to map the scaled transport block size value to the transport block size value of the plurality of transport block size values, are executable by the processor to cause the apparatus to:
map the scaled transport block size value to the transport block size value of the plurality of transport block size values based at least in part on the disregarding.

39. The apparatus of claim 35, wherein the control signaling indicating the network device capability comprises a radio resource control signaling, a UE-specific signaling, a system information block, or a downlink control information, or a combination thereof.

40. The apparatus of claim 31, wherein the instructions are further executable by the processor to cause the apparatus to:
receive, from the network device, configuration information for the modulation scheme, wherein the instructions, to determine whether the apparatus is configured with the modulation scheme, are executable by the processor to cause the apparatus to:
determine that the apparatus is configured with the modulation scheme based at least in part on the configuration information for the modulation scheme, wherein the instructions, to identify the plurality of transport block size values, are executable by the processor to cause the apparatus to:
identify the plurality of transport block size values based at least in part on determining that the apparatus is configured with the modulation scheme.

41. The apparatus of claim 40, wherein the instructions are further executable by the processor to cause the apparatus to:
identify a transport block size index based at least in part on a modulation coding scheme index;
identify a transport block size value based at least in part on the transport block size index and an allocation of resource blocks for the transmission time interval; and
scale the transport block size value by a factor based at least in part on the length of the transmission time interval, wherein the scaled transport block size value is based at least in part on the scaling.

42. The apparatus of claim 31, wherein the instructions, to identify the plurality of transport block size values, are executable by the processor to cause the apparatus to:
identify the plurality of transport block size values in a transport block size lookup table based at least in part on whether the apparatus is configured with the modulation scheme, wherein the instructions, to map the scaled transport block size value to the transport block size value of the plurality of transport block size values, are executable by the processor to cause the apparatus to:
map the scaled transport block size value to the transport block size value of the plurality of transport block size values in the transport block size lookup table.

43. The apparatus of claim 31, wherein the instructions, to determine whether the apparatus is configured with the modulation scheme, are executable by the processor to cause the apparatus to:
determine whether the apparatus is configured with the modulation scheme in at least one band associated with a band-of-band combination, wherein the instructions, to identify the plurality of transport block size values, are executable by the processor to cause the apparatus to:
identify the plurality of transport block size values based at least in part on whether the apparatus is configured with the modulation scheme in the at least one band associated with the band-of-band combination.

44. The apparatus of claim 43, wherein the instructions are further executable by the processor to cause the apparatus to:
identify a transport block size value based at least in part on a transport block size index and an allocation of resource blocks for the transmission time interval; and
scale the transport block size value by a factor, wherein mapping the scaled transport block size value to the transport block size value of the plurality of transport block size values is based at least in part on the modulation scheme for the band-of-band combination.

45. The apparatus of claim 43, wherein the instructions are further executable by the processor to cause the apparatus to:

determine that the apparatus is not configured with the modulation scheme in the at least one band or another band associated with the band-of-band combination; and identify a transport block size value in a transport block size lookup table based at least in part on the apparatus not being configured with the modulation scheme in the at least one band or another band associated with the band-of-band combination, wherein the instructions, to identify the transport block size values, are executable by the processor to cause the apparatus to:

disregard transport block size values corresponding to the modulation scheme associated with the band-of-band combination.

46. The apparatus of claim 45, wherein the instructions are further executable by the processor to cause the apparatus to:

scale the transport block size value associated with the band; and map the scaled transport block size value associated with the band to a transport block size value of the plurality of transport block size values in the transport block size lookup table, the transport block size lookup table including transport block size values corresponding to the modulation scheme associated with the band-of-band combination.

47. The apparatus of claim 45, wherein the instructions are further executable by the processor to cause the apparatus to:

scale the transport block size value associated with the band; and map the scaled transport block size value associated with the band to a transport block size value of the plurality of transport block size values in the transport block size lookup table for the band, wherein the instructions, to map the scaled transport block size value are executable by the processor to cause the apparatus to:

disregard transport block size values in the transport block size lookup table that are related to the modulation scheme associated with the band-of-band combination.

48. The apparatus of claim 43, wherein the instructions are further executable by the processor to cause the apparatus to:

determine that the apparatus is not configured with the modulation scheme for the band-of-band combination;

determine that the apparatus is configured with the modulation scheme for a second band-of-band combination; and identify, for the band-of-band combination, a transport block size value in a transport block size lookup table based at least in part on determining that the apparatus is not configured with the modulation scheme for the band-of-band combination and determining that the apparatus is configured with the modulation scheme for a second band-of-band combination, wherein the instructions, to identify the transport block size values, for the band-of-band combination, are further executable by the processor to cause the apparatus to:

include transport block size values corresponding to the modulation scheme supported by the second band-of-band combination.

49. The apparatus of claim 48, wherein the instructions are further executable by the processor to cause the apparatus to:

scale the transport block size value associated with the band-of-band combination; and map the scaled transport block size value, associated with the band-of-band combination, to a transport block size value of the plurality of transport block size values in the transport block size lookup table, the transport block size lookup table including or excluding transport block size values corresponding to the modulation scheme associated with the second band-of-band combination.

50. The apparatus of claim 43, wherein the instructions are further executable by the processor to cause the apparatus to:

determine that the apparatus is configured with the modulation scheme in at least one band associated with the band-of-band combination;

determine that the apparatus is not configured with the modulation scheme in at least another band associated with the band-of-band combination or for another band-of-band combination, or both; and identify a transport block size value in a transport block size lookup table, for the at least another band associated with the band-of-band combination or for another band-of-band combination, or both based at least in part on the apparatus not being configured with the modulation scheme in the at least another band associated with the band-of-band combination or for another band-of-band combination, wherein the instructions, to identify the transport block size values, are further executable by the processor to cause the apparatus to:

disregard transport block size values corresponding to the modulation scheme associated with the at least one band associated with the band-of-band combination.

51. The apparatus of claim 50, wherein the instructions are further executable by the processor to cause the apparatus to:

scale the transport block size value associated with the at least another band associated with the band-of-band combination or for another band-of-band combination, or both; and map the scaled transport block size value, associated with the at least another band associated with the band-of-band combination or for another band-of-band combination, or both, to a transport block size value of the plurality of transport block size values in the transport block size lookup table, the transport block size lookup table including transport block size values corresponding to the modulation scheme associated with the at least one band associated with the band-of-band combination.

52. The apparatus of claim 50, wherein the instructions are further executable by the processor to cause the apparatus to:

scale the transport block size value associated with the at least another band associated with the band-of-band combination or for another band-of-band combination, or both; and map the scaled transport block size value, associated with the at least another band associated with the band-of-band combination or for another band-of-band combination, or both, to a transport block size value of the plurality of transport block size values in the transport block size lookup table, the transport block size lookup table disregarding transport block size values corresponding to the modulation scheme associated with the at least one band associated with the band-of-band combination.

53. The apparatus of claim 31, wherein the instructions to communicate, with the network device during the transmission time interval, are further executable by the processor to cause the apparatus to:
communicate a downlink communication, an uplink communication, or both.

54. The apparatus of claim 31, wherein the transmission time interval comprises a shortened transmission time interval.

55. An apparatus for wireless communications, comprising:
a processor,
memory in electronic communication with the processor; and
instructions stored in the memory and executable by the processor to cause the apparatus to:
identify a user equipment ((UE)) capability to support a modulation scheme;
identify a plurality of transport block size values that are valid for data communications based at least in part on the capability to support the modulation scheme and the modulation scheme;
map a scaled transport block size value that is based at least in part on a length of a transmission time interval for communicating with the UE to a transport block size value of the plurality of transport block size values that are valid for the data communications based at least in part on the capability to support the modulation scheme and whether the UE is configured with the modulation scheme, wherein the scaled transport block size value is different than the mapped transport block size value, and wherein to map the scaled transport block size value to the transport block size value of the plurality of transport block size values is based at least in part on a subset of a range of a quantity of physical resource blocks, or a subset of a range of a quantity of spatial layers, or both; and
communicate, with the UE during the transmission time interval, data on a transport block having a size corresponding to the mapped transport block size value.

56. The apparatus of claim 55, wherein the instructions are further executable by the processor to cause the apparatus to:
transmit, to the UE, control signaling indicating an apparatus capability to support the modulation scheme, wherein the instructions, to communicate the data on the transport block having the size corresponding to the mapped transport block size value, are executable by the processor to cause the apparatus to:
communicate the data on the transport block having the size corresponding to the mapped transport block size value based at least in part on the control signaling.

57. The apparatus of claim 56, wherein the control signaling indicating the apparatus capability comprises a radio resource control signaling, a UE-specific signaling, a system information block, or a downlink control information, or a combination thereof.

58. The apparatus of claim 55, wherein the instructions are further executable by the processor to cause the apparatus to:
configure the UE with the modulation scheme based at least in part on transmitting, to the UE, configuration information for the modulation scheme, wherein the instructions, to communicate the data on the transport block having the size corresponding to the mapped transport block size value, are executable by the processor to cause the apparatus to:
communicate the data on the transport block having the size corresponding to the mapped transport block size value based at least in part on configuring the UE with the modulation scheme.

59. The apparatus of claim 55, wherein the instructions are further executable by the processor to cause the apparatus to:
identify the modulation scheme based at least in part on an apparatus capability;
determine a modulation coding scheme index and an allocation of resource blocks for the UE based at least in part on the modulation scheme; and
transmit the modulation coding scheme index and the allocation of resource blocks to the UE using the transport block, wherein the instructions, to communicate the data on the transport block having the size corresponding to the mapped transport block size value, are executable by the processor to cause the apparatus to:
communicate the data on the transport block having the size corresponding to the mapped transport block size value based at least in part on transmitting the modulation coding scheme index and the allocation of resource blocks to the UE using the transport block.

60. The apparatus of claim 55, wherein the transmission time interval comprises a shortened transmission time interval.

61. An apparatus for wireless communication, comprising:
means for determining whether the apparatus is configured to support a modulation scheme;
means for identifying a plurality of transport block size values that are valid for data communications based at least in part on a capability to support the modulation scheme and whether the apparatus is configured with the modulation scheme;
means for identifying a scaled transport block size value that is based at least in part on a length of a transmission time interval;
means for mapping the scaled transport block size value to a transport block size value of the plurality of transport block size values that are valid for the data communications based at least in part on the capability to support the modulation scheme and whether the apparatus is configured with the modulation scheme, wherein the scaled transport block size value is different than the mapped transport block size value, and wherein the means for mapping the scaled transport block size value to the transport block size value of the plurality of transport block size values is based at least in part on a subset of a range of a quantity of physical resource blocks, or a subset of a range of a quantity of spatial layers, or both; and
means for communicating, with a network device during the transmission time interval, data on a transport block having a size corresponding to the mapped transport block size value.

62. An apparatus for wireless communications, comprising:
means for identifying a user equipment ((UE)) capability to support a modulation scheme;
means for identifying a plurality of transport block size values that are valid for data communications based at least in part on the capability to support the modulation scheme and the modulation scheme;

means for mapping a scaled transport block size value that is based at least in part on a length of a transmission time interval for communicating with the UE to a transport block size value of the plurality of transport block size values that are valid for the data communications based at least in part on the capability to support the modulation scheme and whether the UE is configured with the modulation scheme, wherein the scaled transport block size value is different than the mapped transport block size value, and wherein the means for mapping the scaled transport block size value to the transport block size value of the plurality of transport block size values is based at least in part on a subset of a range of a quantity of physical resource blocks, or a subset of a range of a quantity of spatial layers, or both; and means for communicating, with the UE during the transmission time interval, data on a transport block having a size corresponding to the mapped transport block size value.

63. A non-transitory computer-readable medium storing code for wireless communication, the code comprising instructions executable by a processor to:

determine whether a user equipment ((UE)) is configured to support a modulation scheme;

identify a plurality of transport block size values that are valid for data communications based at least in part on a capability to support the modulation scheme whether the UE is configured with the modulation scheme;

identify a scaled transport block size value that is based at least in part on a length of a transmission time interval;

map the scaled transport block size value to a transport block size value of the plurality of transport block size values that are valid for the data communications based at least in part on the capability to support the modulation scheme and whether the UE is configured with the modulation scheme, wherein the scaled transport block size value is different than the mapped transport block size value, and wherein to map the scaled transport block size value to the transport block size value of the plurality of transport block size values is based at least in part on a subset of a range of a quantity of physical resource blocks, or a subset of a range of a quantity of spatial layers, or both; and communicate, with a network device during the transmission time interval, data on a transport block having a size corresponding to the mapped transport block size value.

64. A non-transitory computer-readable medium storing code for wireless communications, the code comprising instructions executable by a processor to:

identify a user equipment ((UE)) capability to support a modulation scheme;

identify a plurality of transport block size values that are valid for data communications based at least in part on the capability to support the modulation scheme and the modulation scheme;

map a scaled transport block size value that is based at least in part on a length of a transmission time interval for communicating with the UE to a transport block size value of the plurality of transport block size values that are valid for the data communications based at least in part on the capability to support the modulation scheme and whether the UE is configured with the modulation scheme, wherein the scaled transport block size value is different than the mapped transport block size value, and wherein to map the scaled transport block size value to the transport block size value of the plurality of transport block size values is based at least in part on a subset of a range of a quantity of physical resource blocks, or a subset of a range of a quantity of spatial layers, or both; and communicate, with the UE during the transmission time interval, data on a transport block having a size corresponding to the mapped transport block size value.

* * * * *